United States Patent
Connor et al.

(10) Patent No.: US 7,097,789 B2
(45) Date of Patent: *Aug. 29, 2006

(54) THERMOPLASTIC CONTAINERS EXHIBITING EXCELLENT PROTECTION TO VARIOUS ULTRAVIOLET SUSCEPTIBLE COMPOUNDS

(75) Inventors: Daniel M. Connor, Inman, SC (US); Sean M. Bernhardt, Greenville, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/278,664

(22) Filed: Oct. 23, 2002

(65) Prior Publication Data

US 2003/0155559 A1    Aug. 21, 2003

Related U.S. Application Data

(63) Continuation-in-part of application No. 09/934,377, filed on Aug. 21, 2001, now Pat. No. 6,602,447.

(51) Int. Cl.
*F21V 9/04* (2006.01)
*C08K 5/06* (2006.01)

(52) U.S. Cl. .................. 252/589; 359/885; 524/366
(58) Field of Classification Search ............. 252/589; 359/885; 524/366
See application file for complete search history.

(56) References Cited

U.S. PATENT DOCUMENTS

| | | | |
|---|---|---|---|
| 3,072,585 A | 1/1963 | Milionis et al. | 260/22 |
| 3,120,564 A | 2/1964 | Milionis et al. | 260/562 |
| 3,159,646 A | 12/1964 | Milionis et al. | 260/308 |
| 3,184,521 A * | 5/1965 | Sauer et al. | 528/304 |
| 3,546,270 A | 12/1970 | Kirchmayr et al. | 260/465 |
| 3,634,320 A | 1/1972 | Wetzner et al. | 260/45.85 R |
| 3,809,707 A | 5/1974 | Havinga et al. | 260/404 |
| 3,880,992 A | 4/1975 | Smolin et al. | 424/60 |
| 4,284,729 A | 8/1981 | Cross et al. | 521/158 |
| 4,496,757 A | 1/1985 | Dexter et al. | 560/82 |
| 4,617,374 A | 10/1986 | Pruett et al. | 528/288 |
| 4,619,990 A | 10/1986 | Elmasry | 534/573 |
| 4,732,570 A | 3/1988 | Baumgartner et al. | 8/506 |
| 4,845,188 A | 7/1989 | Weaver et al. | 528/272 |
| 4,853,471 A | 8/1989 | Rody et al. | 548/261 |
| 4,920,169 A | 4/1990 | Avar | 524/219 |
| 4,973,702 A | 11/1990 | Rody et al. | 548/261 |
| 5,057,627 A | 10/1991 | Edwards | 568/618 |
| 5,075,491 A | 12/1991 | Weaver et al. | 560/45 |

(Continued)

FOREIGN PATENT DOCUMENTS

WO    86/00313    1/1986

*Primary Examiner*—Philip C. Tucker
(74) *Attorney, Agent, or Firm*—Terry T. Moyer; John E. Vick, Jr.

(57) ABSTRACT

Novel thermoplastic articles that contain novel ultraviolet absorbing compounds that are liquid in nature, are extremely low in color (and thus permit use without the concomitant necessity of adding large amounts of other coloring agents to combat any discoloring within clear, colorless applications), are substantially non-migratory from target resins, and are highly effective in providing protection in wavelength ranges for which previous attempts at low-color ultraviolet absorbers have failed are provided. In effect, the inventive thermoplastic articles, provide excellent protection for certain vitamins, flavorings, and colorants, for example, from ultraviolet degradation, particularly above the 370 nm wavelength that is typically the high end of protection for clear thermoplastics having low migratory, colorless UV absorbers therein.

29 Claims, 4 Drawing Sheets

U.S. PATENT DOCUMENTS

| | | | |
|---|---|---|---|
| 5,442,086 A | 8/1995 | Krutak et al. | 558/401 |
| 5,459,222 A | 10/1995 | Rodgers et al. | 528/73 |
| 5,543,083 A | 8/1996 | Sivik et al. | 252/403 |
| 5,585,228 A | 12/1996 | Vishwarma et al. | 430/512 |
| 6,008,302 A | 12/1999 | Olson et al. | 525/327.7 |
| 6,037,393 A | 3/2000 | Okumura et al. | 524/91 |
| 6,207,740 B1 | 3/2001 | Zhao et al. | 524/366 |
| 6,307,055 B1 | 10/2001 | Thanki et al. | 548/259 |
| 6,559,216 B1 * | 5/2003 | Zhao et al. | 524/366 |
| 6,596,795 B1 * | 7/2003 | Zhao et al. | 524/205 |
| 6,602,447 B1 | 8/2003 | Danielson et al. | 252/589 |
| 6,872,766 B1 * | 3/2005 | Schunk et al. | 524/357 |
| 6,891,058 B1 * | 5/2005 | Zhao et al. | 558/401 |

* cited by examiner

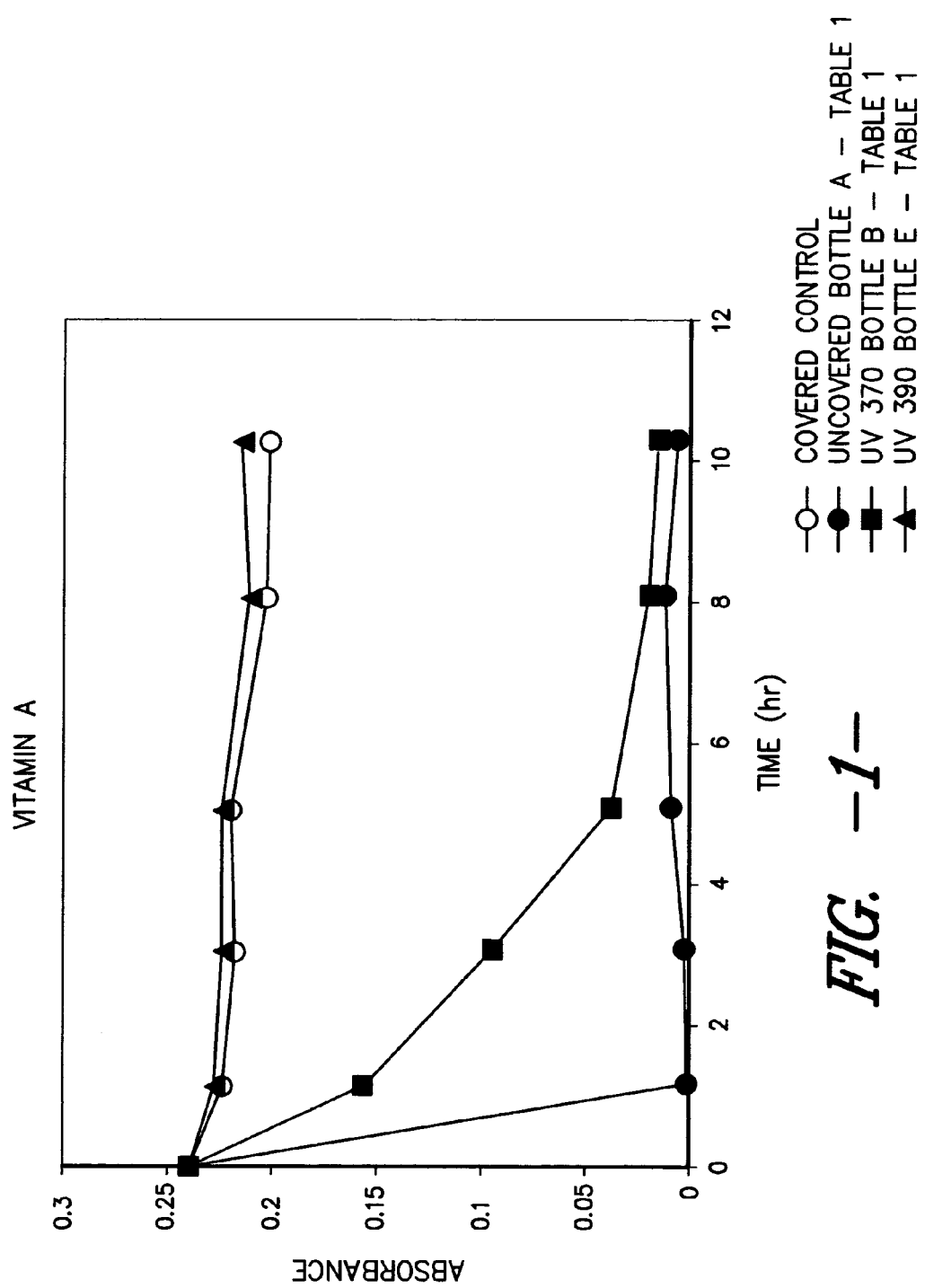
FIG. -1-

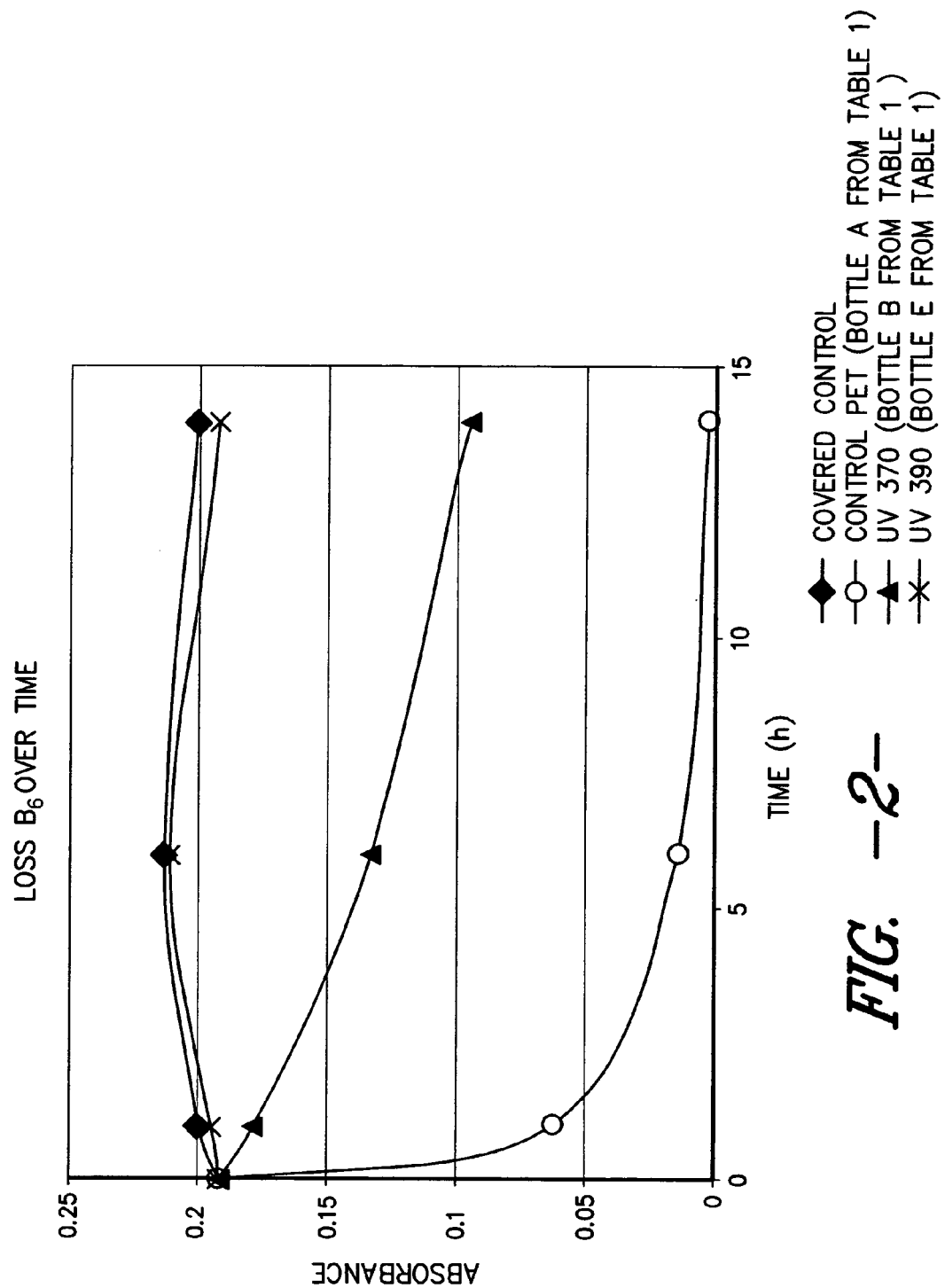

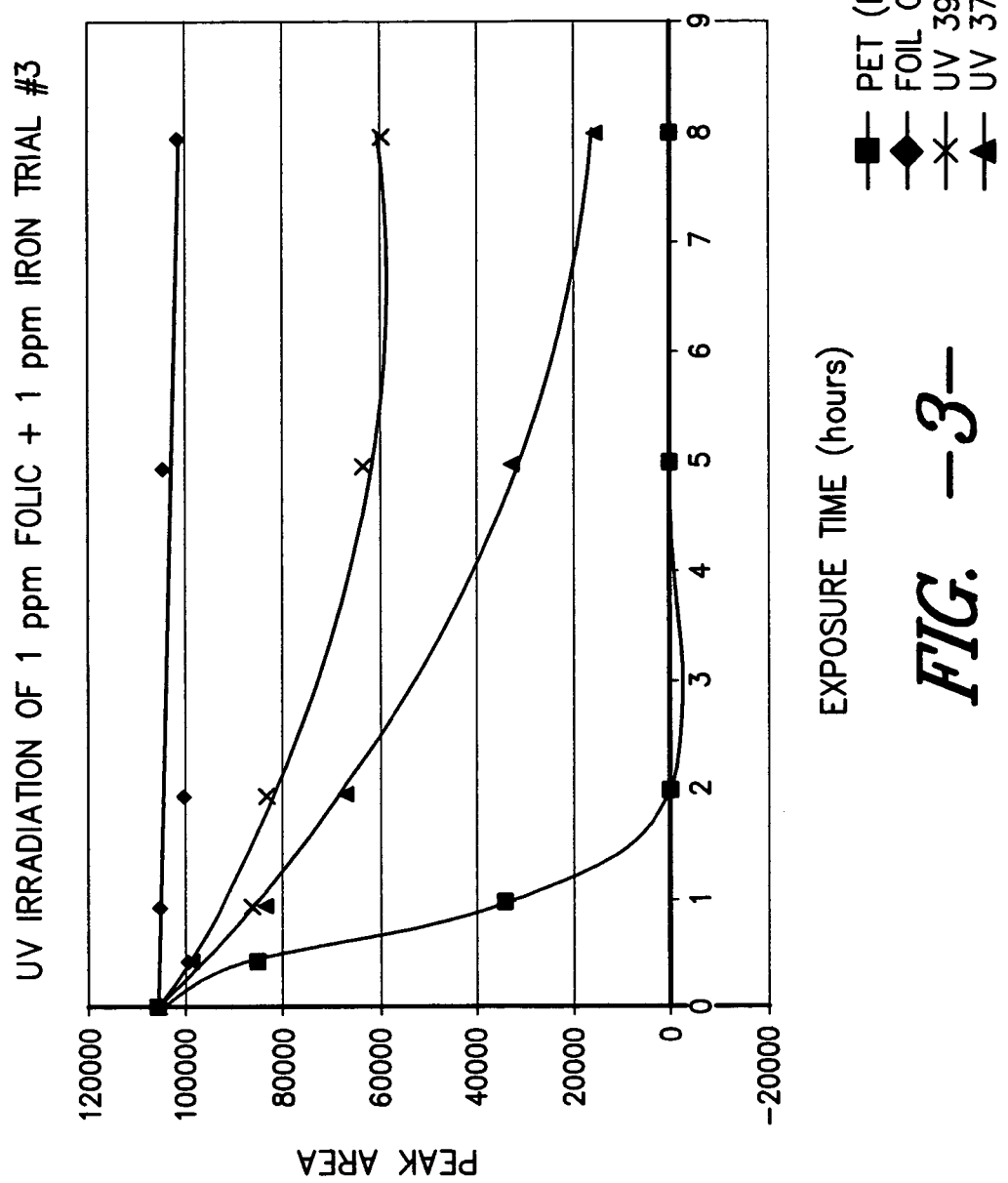
FIG. -3-

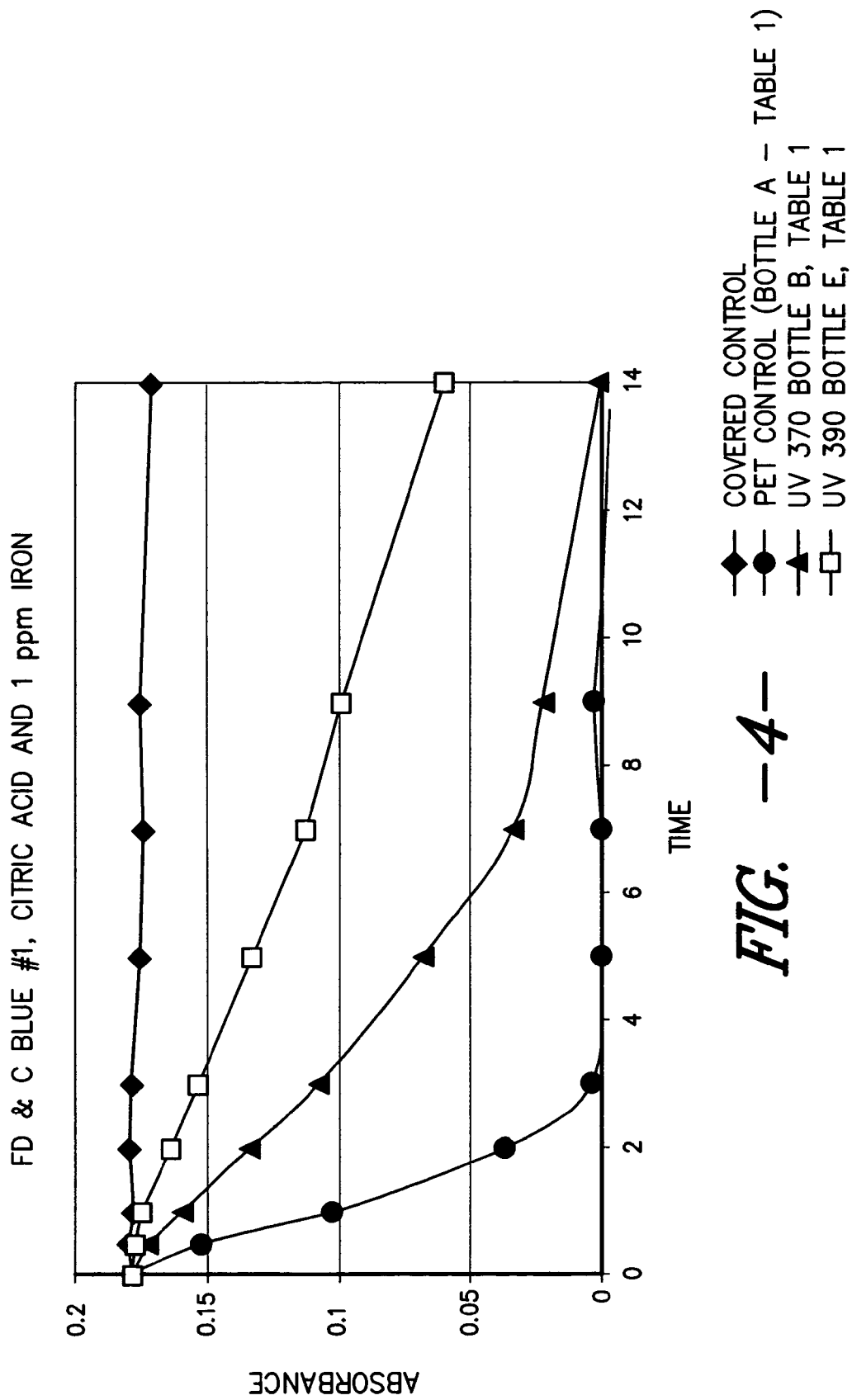

THERMOPLASTIC CONTAINERS EXHIBITING EXCELLENT PROTECTION TO VARIOUS ULTRAVIOLET SUSCEPTIBLE COMPOUNDS

CROSS REFERENCE TO RELATED APPLICATIONS

This application is a continuation in part of application Ser. No. 09/934,377, filed on Aug. 21, 2001, which granted as U.S. Pat. No. 6,602,447.

FIELD OF THE INVENTION

This invention relates to novel thermoplastic articles that contain novel ultraviolet absorbing compounds that are liquid in nature, are extremely low in color (and thus permit use without the concomitant necessity of adding large amounts of other coloring agents to combat any discoloring within clear, colorless applications), are substantially non-migratory from target resins, and are highly effective in providing protection in wavelength ranges for which previous attempts at low-color ultraviolet absorbers have failed. In effect, the inventive thermoplastic articles provide excellent protection for certain vitamins, flavorings, and colorants, for example, from ultraviolet degradation, particularly above the 370 nm wavelength that is typically the high end of protection for clear thermoplastics having low migratory, colorless UV absorbers therein.

BACKGROUND OF THE PRIOR ART

All of the U.S. patents cited throughout this specification are hereby entirely incorporated herein.

Ultraviolet absorber compounds have been utilized for a number of protective applications, including within compositions for covering skin, on and within apparel and other types of textiles, within transparent plastic containers, and the like, to combat the harmful and degradable effects of certain wavelengths of light in the UV spectrum. The best known UV absorbers are benzotriazoles, available from Ciba under the tradename Tinuvin®, and benzophenones, available from Cytec Industries under the trademark Cyasorb™. Such compounds are highly effective in their UV absorber capacity; however, they are quite costly, can prove difficult to incorporate within different target media, and tend to migrate from within certain types of media (such as plastics). Furthermore, these two well known types of UV absorbers present handling difficulties in that they are generally produced and utilized in powder form and have relatively low melting points. Particularly, within plastic media, the powder form of these compounds is problematic; a liquid is much easier to handle, does not require melting, and provides more effective and thorough mixing throughout the target plastic. Additionally, these previously utilized UV absorbers provide UV protection over a relatively narrow range of wavelengths ($\lambda_{max}$ from about 290 to about 340 nm for benzotriazoles; from 260 to 300 nm for benzophenones), which ultimately leaves a potentially damaging range of unprotected UV exposure (to about 400 nm). Attempts to increase the amount of such UV absorber compounds in order to provide potential protection over such a broader wavelength range is generally ineffective due to greater degrees of highly undesirable migration of such compounds from target resins when present in higher amounts therein. Additionally, such greater amounts of UV absorbers increase the production of unwanted colorations within target clear plastics and other like applications such that masking compounds (e.g., bluing agents, for example) must be utilized in relatively high amounts to combat the discoloring effect. Thus, there exists a need to provide a highly effective, liquid ultraviolet absorber which exhibits a versatility to be incorporated within or applied to different and various media and substrates and which, alternatively, can provide protection over the range of wavelengths in the UV spectrum of from about 290 to about 400 nm (in order to provide the best overall protection from possible harm and/or degradation associated with UV exposure).

Methine-based compounds, in particular certain malonate derivatives, as in European Patent Abstract 350-386-A, to L'Oreal SA, are useful as UV absorbers in cosmetic sunscreen compositions, are generally inexpensive to make, and provide UV protection in the spectrum from about 280 to about 360 nm. However, such compounds are highly soluble in organic solvents and would therefore easily migrate from solid compositions, such as plastics, upon introduction therein. Thus, although the utilization of an effective UV absorber, such as a malonate derivative, within plastics, may be highly desirable, such has never been taught nor fairly suggested within the prior UV absorber art due to the great difficulty in producing such a stable, and thus highly effective, UV absorbing composition from such a methine-based source. There exists a need then to produce an inexpensive UV absorber, preferably methine-based, which possesses the requisite ability to remain within media such as thermoplastics and the like (as noted above), and thus provide necessary and desirable protection from degradation due to UV exposure.

Further developments for the ultraviolet protection of certain polymeric media (such as polyesters) have included vanillin- and resorcinol-based compounds which, to be effective in terms of low extraction from such a thermoplastic, must be introduced during the actual polymerization reaction of the base thermoplastic polymer itself. For example, U.S. Pat. No. 4,617,374 to Pruett et al. teaches such UV absorbers for polyester end-uses. Again, however, such compounds exhibit very high extraction results unless they are added as to-be-polymerized reactants themselves with the ester monomers during the polymerization step. In such an instance, these UV absorbers are actually integrated within the polymer, and not just mixed within the thermoplastic medium. As such, although such compounds do exhibit excellent results when polymerized within the target polyester, unfortunately such compounds are limited in their versatility since the only time during which effective introduction is permitted is during the aforementioned polymerization procedure. There thus still remains a need to provide a more versatile UV absorber for thermoplastic end-uses such that the producer can introduce the UV absorber at any time during the production of the target thermoplastic such that the additive does not exhibit such high extraction and yet still provides excellent UV absorbing properties thereto.

Furthermore, there also exists the need to provide a clear thermoplastic article that exhibits highly effective ultraviolet protection with extremely low migratory UV absorbers that also exhibit very low coloring (if any) within the thermoplastic itself (or any discolorations can easily be remedied through the presence of optical brighteners and/or bluing agents therein) and that prevent degradation of certain vitamins, flavorings, colorants, dyes, etc., when stored within such an article.

It has now been found that through the addition of polyoxyalkylene chains onto certain ultraviolet absorber compounds, greater versatility of potential uses for the new UV absorber is provided, particularly in terms of the needed low-extraction as noted above. Therefore, it has been found that such polyoxyalkylenated compounds (such as those, without intending to limit the breadth of the invention, based on vanillin and resorcinol base compounds) provide UV absorbers which are highly effective in filtering harmful UV-A and UV-B rays over a broad spectrum ($\lambda_{max}$ from about 280 to about 400 nm, more preferably from about 320 to about 400 nm). Furthermore, it has been found that in combination with a benzotriazole and/or a hydroxybenzophenone, or other similar type of UV absorber compound, the resultant composition is accorded protection from a great amount of potentially damaging UV radiation (from approximately 250 to about 400 nm). Additionally, such a combination is highly stable within the desired media, and thus provides long-term protection to the desired sample stored within the target treated plastic article. Additionally, such compounds are very low in color when prepared in accordance with certain procedures, most notably with certain alkoxylation catalysts, including, without limitation, metal hydroxides and other bases, both alone and in the presence of amine-based alkoxylation catalysts (particularly with affinities for available protons), as well as rare earth phosphate salts, such as those taught within U.S. Pat. No. 5,057,627 to Edwards. Such low-color alternatives thus provide the basis for effective utilization within colorless (clear and transparent) applications, such as the desired clear plastics, while simultaneously providing the necessary effective UV protection.

Although some interest has been demonstrated within the area of certain methine-based UV absorber compounds (i.e., L'Oreal's malonate derivatives), to date there has been no disclosure or fair suggestion regarding the utilization of the polyoxyalkylenated derivatives of such UV absorbers in that capacity within certain media (such as, for example, plastics), or on other surfaces (skin, textiles, for example), or in other applications (inks, and the like, for example). In particular, no disclosures exist concerning low-color, low-extraction (migration) polyoxyalkylenated UV absorber compounds that provide effective protection from UV exposure between the wavelengths of from about 320 to about 400 nm. There is thus a great need within the UV absorber market, and most particularly within the transparent plastic film and container markets (for storing and protecting food, pills, and the like) for such types of improvements associated with relatively inexpensive materials and processes provided by the inventive polyoxyalkylenated methine-based UV absorber compounds.

Other ultraviolet absorbing compounds and compositions have been developed or modified for certain plastic (thermoplastic, thermoset, etc.) applications, such as a class of compounds known by the name of Tinuvin®, available from Ciba, and noted above. Although such compounds appear to provide very good ultraviolet protection both to the plastic itself and to any stored liquids, solids, etc., within a container made therewith such plastics, unfortunately such a class of compounds exhibits undesirable or problematic deficiencies. In particular, the breadth of protection within the UV spectrum is generally limited to from about 320 to about 375 nm with such compounds. Thus, they generally do not provide adequate UV protection to contents of plastic packaging over the entire range of UV wavelengths. Also, such Ciba compounds are all naturally solid in nature and thus are either dispensed within target resins as solid powders or must be dispersed within liquids by the end-user at time very close to dispensing in order to be effective. Lastly, and most importantly, such Ciba compounds exhibit relatively high extraction levels and migratory characteristics from within target plastic resins, particularly thermoplastics such as polyethylene terephthalates. Thus, although such compounds are effective for UV protection to a certain extent, there are a number of drawbacks for which improvements are highly desired and necessary. To date, there thus remains a great need to provide an effective UV absorber that eliminates the above-noted deficiencies.

Furthermore, to date, there have been no clear, substantially colorless, thermoplastic containers that provide effective UV protection, particularly on the order of a completely opaque container. Such a clear, colorless, high UV protecting container is highly desirable simultaneously for shelf life durability of materials stored therein as well as aesthetic purposes. However, again, such a container has not been made available to the pertinent industries.

OBJECTS OF THE INVENTION

It is therefore an object of this invention to provide novel clear, substantially colorless, thermoplastic container including a low-thermoplastic-migrating (e.g., low-extraction), ultraviolet absorbing compound, which may further be liquid when present in its pure, undiluted state at room temperature and that provide effective UV protection to said container's contents over a broad range of wavelengths up to at least 390 nm. A further objective of this invention is to provide a clear, colorless, thermoplastic container including a polymeric UV absorber that can be used within various media and on different substrates as an effective UV filtering compound or within a suitable composition for protection against potentially harmful ultraviolet rays. A further object of this invention is to provide a methine-based UV absorber that provides bright and clear plastic articles. It is yet another object of this invention to provide certain polyoxyalkylenated methine-based ultraviolet absorbers which do not require the presence of an appreciable amount of bluing agent in order to provide a low-yellowing effect within clear thermoplastic applications (and thus provides brighter clarity within the target plastic or other medium). Yet another object of the invention is to provide an effective UV absorbing composition or article which comprises the inventive low-color, low-thermoplastic-migrating ultraviolet absorbing compounds, particularly wherein such compounds liquid in nature when undiluted at room temperature. Additionally, an object of this invention is to provide a low-color UV absorber that provides protection to contents within clear thermoplastic packages such that degradation will not readily occur due to exposure to UV wavelengths within the range of 250 to 400 nm (such that a test compound, for example riboflavin, retains its constitution in amounts exceeding 25% of its starting amount within an aqueous solution thereof when stored within a clear thermoplastic container when exposed to UV radiation from 250 to 400 nm for a minimum of 20 hours). Also, methods of producing such low-color UV absorbing compounds are also provided.

DESCRIPTION OF THE INVENTION

Accordingly, the present invention thus encompasses a clear thermoplastic article comprising at least one ultraviolet absorber compound exhibiting ultraviolet absorption characteristics over the range of wavelengths from about 300 to about 400 nm such that said article exhibits a UV transmission of at most 10% at the 390 nm wavelength; and wherein said at least one compound exhibits an extraction level from said thermoplastic article measured as the level of absorbance exhibited by a heated alcohol extract solution after 2 hours exposure of at most 0.1 absorbance units, preferably 0.05, more preferably 0.025, and most preferably as low as 0.02; wherein said ultraviolet absorber comprises at least one poly(oxyalkylene) chain, or alternatively wherein said ultraviolet absorber is introduced within said thermoplastic at any time during the production of said article, or also alternatively, wherein said at least one ultraviolet absorber is a liquid prior to incorporation within said thermoplastic article and at room temperature in its pure, undiluted state. Also considered part of this invention is the same clear thermoplastic article as above wherein said thermoplastic article simultaneously exhibits a yellowness level of at most 2.5 and a brightness level of at least 90. Additionally encompassed within this invention is a liquid ultraviolet absorber compound exhibiting a Gardner color value of at most 8, wherein said ultraviolet absorber exhibits an extraction level from polyethylene terephthalate measured as the level of absorbance exhibited by a heated alcohol extract solution after 2 hours exposure of at most 0.1 absorbance units, preferably 0.05, more preferably 0.025, and most preferably as low as 0.0. Additionally encompassed within this invention is a clear, substantially colorless thermoplastic article comprising at least one ultraviolet absorber compound exhibiting an extraction level from said thermoplastic article measured as the level of absorbance exhibited by a heated alcohol extract solution after 2 hours exposure of at most 0.1 absorbance units; and wherein said article provides protection from ultraviolet exposure such that upon introduction of an aqueous solution of Vitamin $B_2$ exhibiting an initial UV-Vis absorbance at a wavelength of 325 said specified vitamin exhibits at least 35% retention of the initial UV-Vis absorbance at 444 nm wavelength after 9 hours of sealed exposure under the UV Weathering Test. Further inventions encompassed within this invention include a clear, substantially colorless thermoplastic article comprising at least one ultraviolet absorber compound exhibiting an extraction level from said thermoplastic article measured as the level of absorbance exhibited by a heated alcohol extract solution after 2 hours exposure of at most 0.1 absorbance units; and wherein said article provides protection from ultraviolet exposure such that upon introduction of an aqueous or ethanol solution of Vitamin $B_2$ exhibiting an initial UV-Vis absorbance at a wavelength of 444 nm, or initial peak area as measured by HPLC, said Vitamin A, $B_6$, Folic Acid, and/or FD&C Blue #1 exhibits substantial retentions of initial absorbance levels at each vitamin or colorant's $\lambda_{max}$ nm wavelength after 14 hours of sealed exposure under the UV Refrigeration Test well in excess of that for prior art UV absorbers that are limited in protection to 370 nm with both providing substantial colorless results and non-migratory properties from the target resins. it should be evident that such requirements of UV-Vis and HPLC tests and the measurements therefrom as defined above are not required to be part of any commercialized article, only properties exhibited by such thermoplastic articles after testing via these specific manners. Thus, taking an article meeting the limitations of the UV absorber, and color levels, and introducing the stock solutions of such vitamins or colorants, taking the initial readings as above (absorbance or peak area) and then measuring the degradation (or retention) levels after UV exposure as above, is the test to determine if the articles themselves meet the limitations of the invention.

Further encompassed within this invention is an ultraviolet compound conforming to the structure represented by Formula (I)

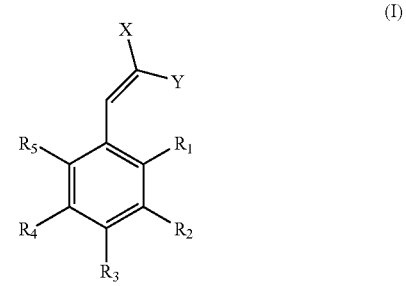

wherein $R_1$, $R_2$, $R_3$, $R_4$, and $R_5$ are the same or different and are selected from the group consisting of $C_{1-20}$ alkyl, halo, hydroxyl, hydrogen, cyano, sulfonyl, sulfo, sulfato, aryl, nitro, carboxyl, $C_{1-20}$ alkoxy, and B-A, wherein at least one of $R_1$, $R_2$, $R_3$, $R_4$, and $R_5$ is B-A, wherein B is selected from the group consisting of N, O, S, $SO_2$, $SO_3$, $CO_2$, and A is represented by the Formula (II)

[Alkyleneoxy constituent]$_Z$R'  (II)

wherein Alkyleneoxy constituent is selected from the group consisting of $C_{2-20}$ alkyleneoxy, R' is selected from the group consisting of hydrogen, $C_{1-20}$ alkoxy, $C_{1-20}$ alkyl, and $C_{1-20}$ esters; wherein if B is N, then Z is 2, and if B is other than N, then Z is 1; X and Y are the same or different and are selected from the group consisting of hydrogen, cyano, C(O)OR, C(O)R, C(O)NR"R''', $C_{1-20}$alkyl, and $C_{1-20}$ alkoxy, or X and Y are combined to form a ring system, and R, R", and R''' are defined as above for any of $R_1$, $R_2$, $R_3$, $R_4$, and $R_5$; and wherein if X and Y are not combined to form a ring system then at least one of said X and Y is either cyano or hydrogen. Another important part of this invention is thus a low-color ultraviolet absorbing compound as well as a method of forming such a low-color ultraviolet absorber compound wherein said ultraviolet absorber compound conforms to structure represented by Formula (III)

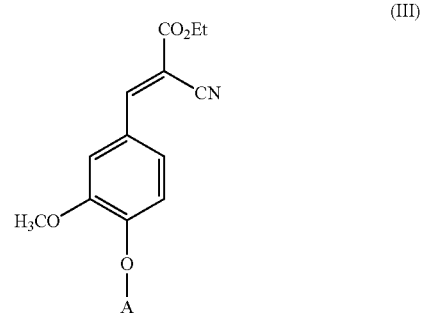

wherein A is represented by the Formula (II)

[Alkyleneoxy constituent]R'  (II)

wherein Alkyleneoxy constituent is selected from the group consisting of from 1 unit to as many as 100 repeating units of at least one of $C_{2-20}$ alkyleneoxy, glycidol, and any mixtures thereof, and R' is selected from the group consisting of hydrogen, $C_{1-20}$ alkoxy, $C_{1-20}$ alkyl, and $C_{1-20}$ esters; wherein the method comprises the sequential steps of a) reacting vanillin with at least one compound selected from the group consisting of at least one compound comprising at least one oxyalkylene-containing group selected from the group consisting of at least one $C_2$–$C_{20}$ alkylene oxide, glycidol, and any mixtures thereof, in the presence of a catalyst; and b) reacting the reaction product of step "a" with at least one alkyl cyanoester (such as, without limitation ethyl cyanoacetate). Such a novel compound should exhibit a Gardner color level of at most 10 when present within a methanol solution at a 5% concentration by volume and a maximum ultraviolet absorption within the range of wavelengths of 320 and 400 nm, with a measured ultraviolet transmission of at most 10% at each wavelength between 390 and 400 nm. Also, such a novel compound may also be liquid in its pure,undiluted state at room temperature, again to facilitate handling and introduction within desired media, such as, without limitation, thermoplastics.

Also, this invention encompasses a method of forming a low-color ultraviolet absorber compound wherein said ultraviolet absorber compound conforms to structure represented by Formula (IV)

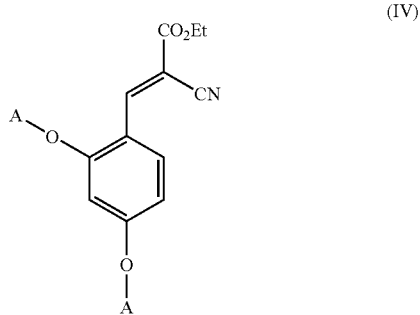

(IV)

wherein A is represented by the Formula (II)

[Alkyleneoxy constituent]R'   (II)

wherein Alkyleneoxy constituent is selected from the group consisting of from 1 unit to as many as 100 repeating units of at least one of $C_{2-20}$ alkyleneoxy, glycidol, and any mixtures thereof, and R' is selected from the group consisting of hydrogen, $C_{1-20}$ alkoxy, $C_{1-20}$ alkyl, and $C_{1-20}$ esters; said method comprising the sequential steps of a) reacting resorcinol with a compound selected from the group consisting of at least one compound comprising at least one oxyalkylene-containing group selected from the group consisting of at least one $C_2$–$C_{20}$ alkylene oxide, glycidol, and any mixtures thereof, in the presence of a catalyst to produce a polyalkoxylated resorcinol; and b) reacting the reaction product of step "a" with a compound whereby said compound protects the polyalkoxylate hydroxyl groups;

c) converting the product of step "b" to an aromatic aldehyde through the production of a Vilsmeier complex;

d) subsequently reacting the aldehyde of step "c" with a deacetylating compound to deprotect the polyalkoxylate hydroxyl groups; and e) subsequently reacting the resultant product of step "d" with an alkyl cyanoester (such as, without limitation, ethyl cyanoacetate).

Such a novel compound, as that defined by structure (III), above, should exhibit a Gardner color level of at most 11 when present within a methanol solution at a 5% concentration by volume and a maximum ultraviolet absorption within the range of wavelengths of 320 and 400 nm, with a measured ultraviolet transmission of at most 10% at each wavelength between 390 and 400 nm. Also, such a novel compound may also be liquid in its pure,undiluted state at room temperature, again to facilitate handling and introduction within desired media, such as, without limitation, thermoplastics.

Compositions comprising such compounds of (III) and (IV) are also encompassed within this invention, particularly those comprising such compounds and bluing agents, as liquids or as pellets for further introduction within desired molten thermoplastic formulations. Methods of making such compositions, particularly thermoplastics, comprising such compounds of (I), (III), and (IV) are also contemplated within this invention.

The term "thermoplastic" is intended to encompass any synthetic polymeric material that exhibits a modification in physical state from solid to liquid upon exposure to sufficiently high temperatures. Most notable of the preferred thermoplastic types of materials are polyolefins (i.e., polypropylene, polyethylene, and the like), polyester (i.e., polyethylene terephthalate, and the like), polyamides (i.e., nylon-1,1, nylon-1,2, nylon-6 or nylon-6,6), polystyrenes, polyurethanes, polycarbonates, polyvinyl halides (i.e., polyvinyl chloride and polyvinyl difluoride, as merely examples), and the like. Preferred thermoplastics within this invention are polyesters, and most preferred is polyethylene terephthalate.

Such thermoplastic articles include bottles, storage containers, sheets, films, fibers, plaques, hoses, tubes, syringes, and the like. Included within this list would be polyester, polystyrene and other like clear resinous materials in sheet form which are present within windows for strength and resiliency functions. In such an instance, the low-color UV absorbers of this invention would provide or contribute to excellent UV protection for contents with target packaging articles or persons located indoors (such as within houses, buildings, cars, and the like, comprising windows with such additives included therein). Basically, the possible uses for such a low-color, low-migratory UV absorber is voluminous and cannot easily be enveloped. Other possible end-uses, however, would include solvent systems, printing inks, textile treatment compositions (either on or within textiles, fibers, fabrics, and the like).

Other types of articles contemplated within this invention for the particularly disclosed clear UV protected thermoplastics include, again without limitation, films, sheets, bottles, containers, vials, and the like. Ultraviolet absorbers are typically added to such compositions during the injection molding (or other type of molding, such as blow molding), thereof, including, and without limitation, by mixing the liquid absorber with resin pellets and melting the entire coated pellets, or through a masterbatch melting step while the resin and absorber are pre-mixed and incorporated together in pellet form. Such plastics include, again without limitation, polyolefins, polyesters, polyamides, polyurethanes, polycarbonates, and other well known resins, such as those disclosed within U.S. Pat. No. 4,640,690, to Baumgartner et al., and U.S. Pat. No. 4,507,407, to Kluger et al. under the term "thermoplastics". Generally, such plastics, including the UV absorber additive, are formed through any number of various extrusion, etc., techniques, such as those disclosed in the aforementioned U.S. patents. Preferred thermoplastics are polyesters, such as, in one non-limiting embodiment, polyethylene terephthalate. "Plastic packaging" thus encompasses containers, sheets, and the like, utilized for storage purposes and which include the plastics in any combination as noted above.

The term "pure, undiluted state" as used in conjunction with the UV absorbing compounds indicates that the compounds themselves without any additives are liquid at room temperature. Thus, there is no need to add solvents, viscosity modifiers, and other like additives to the UV absorbers to effectuate such a desirable physical state.

Such inventive polymeric UV absorbers, as noted above, are very low in color (e.g., do not exhibit a degree of yellowing above 2.5 on the L-a-b scale). Thus, there is no need to add other colorants (such as bluing agents, for example), acid scavengers, and other like additives, to the particular UV absorber to provide such desired low-color (low-yellowing) characteristics. It should be well understood by one of ordinary skill in this art that such a benefit as low-yellowing without any other additives present applies solely to the particular compounds and does not indicate that any compositions comprising such compounds solely include such inventive compounds as thermoplastic additives. In fact, other additives, such as the aforementioned bluing agents, acid scavengers, antistatic agents, optical brighteners, and the like, may also be added to these compounds prior to, during, and/or after introduction within the desired end product medium (such as thermoplastic, for example).

The term "solvent systems" encompasses any aqueous or organic liquid formulations. Non-limiting examples of the intended aqueous systems include cleaning solutions, detergents, fabric softeners, marking inks and colorants, and keratin dyes. Non-limiting examples of organic formulations include the non-aqueous types of cleaning solutions, detergents, fabric softeners, marking inks and colorants, keratin dyes, as well as descalers, surfactant formulations, hydrocarbon compositions, and the like. The addition of inventive UV absorbers is accomplished through the mere addition of the liquid compound within the target solvent system with simultaneous and thorough mixing.

Printing inks include compositions utilized as colorants within, again, as merely examples, pens, including, but not limited to ball-point and fountain pens, dot-matrix printers, toners for standard copy machines, ink-jet applications, permanent markers, dry-erase markers, newsprint, magazine print, laser jet printers, and the like. The addition of inventive UV absorbers is accomplished through the mere addition of the liquid compound within the target printing ink formulations with simultaneous and thorough mixing.

The term textile treatment compositions comprises both any formulations for application on textiles (and thus leaving at least a temporary UV absorbing coating, or the like, on the textile surface). Incorporation of the inventive compounds within fibers of textiles is also encompassed within this term and thus within this invention. Skin protectant and skin tanning formulations basically encompass any compositions comprising the novel UV absorbing compound which is utilized to protect skin from solar radiation.

The benefits accorded by the aforementioned novel ultraviolet absorbing compounds are plentiful, considering the state of the art at this time. For example, clear thermoplastic or thermoset article are highly desirable in order to facilitate recognition of compositions and formulations contained within such articles, for evident reasons. For aesthetic purposes, such clear articles should not exhibit any discoloration. With most standard UV absorbers used today, yellowing is prevalent due to the inherent nature of the compounds themselves providing such color in order to absorb within the UV range. Thus, as noted previously, bluing agents, in relatively high amounts, are required to counter this effect and provide the desired uncolored resin. The inventive plastics (and inventive compounds) do not exhibit such discolorations to such a degree and thus, even though some yellowing may be exhibited by such compounds, and thus within the target thermoplastics, the use of much lower amounts of bluing agents provides the needed clear, uncolored resin, thereby saving on cost and reducing the work needed to provide such a proper clear article as well as a brighter article. Because bluing agents not only aid in preventing yellowness within target media, but also contribute grayness therein as well, the utilization of large amounts of such agents is generally avoided. The inventive compounds thus provide clarity with low grayness levels due to the low-color aspects available therewith. As a result, the desired clear plastics exhibit heretofore unattained brightness levels with simultaneously extensive and effective ultraviolet protection over a wide range of wavelengths (as discussed above). The term "substantially colorless" thus encompasses a thermoplastic that exhibits extremely low yellowing (at most a yellowness index of 0.1) with minimal amounts of bluing agents present therein (at most about 2 ppm). Furthermore, such effective UV absorbing characteristics are noticeable in terms of protection for certain contents of target thermoplastic storage articles. As discussed further below, such inventive UV absorbers exhibit highly desirable ultraviolet absorption characteristics over the range of wavelengths from about 300 to about 400 nm such that an aqueous composition of riboflavin present within said clear thermoplastic article will exhibit a degradation rate of at most 65% (35% retention of absorbance) after ultraviolet exposure over the wavelength range of 300 to 400 nm after 14 hours of exposure to high intensity UV light.

Furthermore, such inventive compounds exhibit extremely low migratory (e.g., low-extraction) levels from plastics and other media. The presence of poly(oxyalkylene) chains thereon provides a very versatile UV absorbing compound as a liquid or low viscosity additive that, exhibits thorough and effective mixing when introduced within the target thermoplastic and following molding and cooling also exhibits very low extraction levels therefrom. Such resultant low extraction levels are exhibited by said inventive compound (as well as said inventive thermoplastic) no matter when the inventive UV absorber compound is introduced within the target thermoplastic during production thereof. Thus, introduction at the polymerization stage (as in Pruett et al.), as well as at the injection molding stage, or even during the initial mixing stage of the target thermoplastic with its additives, all accord a very low-extraction result for the inventive UV absorbers. Such versatility thus permits the user to set up his reaction method in terms of other limitations, rather than on the limits imposed by the effective introduction of a low-extraction UV absorber compound (as now is the case in Pruett et al.). Such a benefit thus accords the user the flexibility to introduce the necessary effective UV absorber at any time during thermoplastic production. Hence, introduction of such polymeric compounds within the target resins at any time during the production method is facilitated by the liquid nature of most of the inventive polymeric UV absorber compounds. Handling is greatly improved thereby, and more thorough dispersion within the desired medium is accomplished as well. Again, costs are reduced due to simplicity and reliability is increased with more thorough mixing, etc., through utilization of such inventive compounds with simultaneous or concomitant reliability in terms of performance and low extraction characteristics.

Additionally, such a highly reliable, easy-to-handle, low-color, and low-migratory (low-extraction) UV absorbing compound also provides a greater range of protection than the standard UV absorbers now provided within the industry. Generally, such standard UV absorbers are effective up to about 380 nm, even with an increase in amount of such a compound within the target medium (polyester, for example). Even with increased amounts of such standard UV absorbers present within the target media (such as thermoplastics), the discolorations within the target medium are more pronounced without a correlated benefit in a greater range of protected wavelengths. To the contrary, the inventive compounds provide protection up to about 400 nm. This effect is easily shown through the selection of a certain chemical compound prevalent within stored liquids and solids that is highly susceptible to UV attack and decomposition. For instance, as is shown in greater detail below, riboflavin (Vitamin $B_2$) meets such a description; in comparison with standard UV absorbers (Tinuvin® 234, for example), the protection accorded riboflavin within an aqueous solution and stored within a clear polyethylene terephthalate container and exposed to a UV source between 320 and 400 nm for 9 hours is significantly higher for the inventive vanillin- and resorcinol-based compounds. Such an improvement, in combination with any or all of the other characteristics exhibited by these inventive compounds, thus shows the novelty and usefulness of such compounds, particularly within clear, and possibly plastic, applications.

In particular, such inventive UV absorbing compounds then conform to the following structure (I)

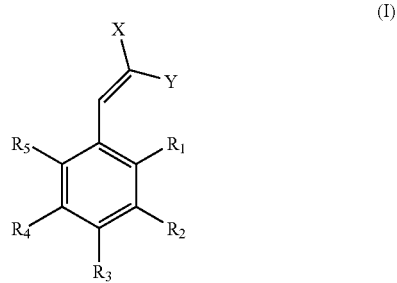

(I)

wherein $R_1$, $R_2$, $R_3$, $R_4$, and $R_5$ are the same or different and are selected from the group consisting of $C_{1-20}$ alkyl, halo, hydroxyl, hydrogen, cyano, sulfonyl, sulfo, sulfato, aryl, nitro, carboxyl, $C_{1-20}$ alkoxy, and B-A, wherein B is selected from the group consisting of N, O, S, $SO_2$, $SO_3$, and A is represented by A is represented by the Formula (II)

(II)

wherein Alkyleneoxy constituent is selected from the group consisting of $C_{2-20}$ alkyleneoxy, R' is selected from the group consisting of hydrogen, $C_{1-20}$ alkoxy, $C_{1-20}$ alkyl, and $C_{1-20}$ esters; wherein if B is N, then Z is 2, and if B is other than N, then Z is 1; X and Y are the same or different and are selected from the group consisting of hydrogen, cyano, C(O)OR, C(O)R, $C_{1-20}$alkyl, and $C_{1-20}$ alkoxy, and R is defined as above for any of $R_1$, $R_2$, $R_3$, $R_4$, and $R_5$; wherein at least one of $R_1$, $R_2$, $R_3$, $R_4$, and $R_5$ is B-A; and at least one of said X and Y is either cyano or hydrogen. Preferably, when X is an ester group, Y is cyano, B is O, Preferably, Alkylene constituent is either oxyethylene, oxypropylene, or oxybutylene, with oxyethylene and oxypropylene most preferred (between 2 and 100 units of such monomers; preferably between 2 and 50; and most preferably, between 5 and 20); and R' is preferably hydrogen. Such compounds thus must also exhibit the aforementioned low-color and low-migration (from the target medium, such as plastic) characteristics, as well as existing as a liquid when in its undiluted state at room temperature.

Preferably, such a low-color ultraviolet absorbing compounds conform to the structures represented by Formulae (I), (III), and (IV), above. Such compounds are poly(oxyalkylenated) in order to provide the desired low extraction levels from thermoplastics as discussed above. The ability to provide such low-color species for structures conforming to Formulae (I) and (III), above, and thus not resorcinol-based compounds, is apparently controlled through the utilization of specific types of alkoxylation catalysts, including, without limitation, rare earth salts (such as lanthanum phosphates), particular metal hydroxides (such as potassium hydroxide both alone and in the presence of compounds having a strong affinity for free and/or available protons within the reaction medium itself, hereinafter referred to as "proton sponge"), and the like. Such catalysts, particularly the rare earth phosphates, apparently are configured in such a way that the levels of impurities present within the reaction itself if drastically reduced in comparison with other standard alkoxylation catalysts (such as sodium hydroxide)(although the true reasons behind such beneficial low-color production are not completely understood). Preferred are lanthanum phosphate catalysts which are white powdery materials having a mean particle size (D50) of between 5 and 50 microns, a lanthanum content of at least 58% by weight, and is substantially free from any chlorine. The poly(oxyalkylenated) products catalyzed therefrom exhibit much less color in comparison with other standard alkoxylation catalysts such as NaOH, as noted previously). Such a preferred catalyst is the same utilized within the particular examples below.

Furthermore, without intending to be limited to any specific scientific theory, it is postulated that such proton sponge compounds prevent the potentially deleterious reaction of strongly charged proton species from attacking the final reactants and reaction products and thus curtails the production of discoloring compounds within the final product itself. Examples of such proton sponge compounds include, without limitation, 1,8-bis(dimethylamino) naphthalene, 1,8-bis(diethylamino)-2,7-dimethoxynaphthalene, 4,5-bis(dimethylamino)-fluorene, 4,5-bis(dimethylamino) phenanthrene, quino[7,8-n]quinoline, and the like, with 1,8-bis(dimethylamino)naphthalene preferred.

Preferably, the alkoxylated compounds include either ethylene oxide or propylene oxide, or mixtures of both, thereon having chain lengths from 2 to about 100; more preferably such a chain length if from about 2 to about 50; and most preferably such a chain length is from about 5 to about 10, with all ethylene oxide also highly preferred. The vanillin-based UV absorbing compounds of structure of Formula (III) are thus preferred embodiments of structure of Formula (I).

The structures conforming with Formula (IV) are also preferred embodiments of the structure of Formula (I)] are produced as low-color poly(oxyalkylenates) through the above-noted modified formylation of a hydroxyl-protected alkoxylated resorcinol through Vilsmeier complexation and subsequently deacetylating such a compound. In such an instance, the initial alkoxylation may be performed through catalysis with most standard alkoxylation catalysts. Again, the same types of oxyalkylenes and chain lengths thereof as noted above for the structures of Formulae (I) and (III) are preferred as well for the structure of Formula (IV). The starting material within the method of making such a compound is thus any resorcinol-based compound, preferably resorcinol itself. After alkoxylation, the resultant compound is reacted with a protecting compound for the free hydroxyls thereon. Such a protecting compound may be an ester anhydride, preferably at least one of $C_1$–$C_{20}$ ester anhydride, more preferably acetic anhydride. The protected compound is then formylated with a Vilsmeier complex formed from, for example, N,N-dimethyl formamide and phosphorous oxychloride and can be any standard compound of this type, including, without limitation disubstituted formamides reacted with either phosphorous oxychloride, phosgene, or triflic acid, as merely examples. Of course, any other aldehyde-forming group will function within this method in order to produce an aromatic aldehyde based on the protected resorcinol polyoxyalkylenated compound [such as resorcinol (6 moles of ethylene oxide aka EO) diacetate]. In order to obtain a low color aldehyde product, the formylation reaction is run at a lower temperature (i.e. 70° C. vs. 90° C.) and in the presence of hypophosphorous acid. Hypophosphorous acid is a well known reducing agent and it is believed that its presence counters the formation of highly colored oxidized species. The exclusion of oxygen during the reaction thus is highly critical as well. After the aldehyde is formed, the protected hydroxyls are then deprotected via base hydrolysis.

Compositions comprising such compounds are also encompassed within this invention, particularly those of the compounds and bluing agents as liquids or as pellets. These broadly defined compounds as well as the more specific types thus provide the necessary characteristics for clear applications (again, clear plastics, as one non-limiting example) in terms of low color, low migration, liquid state, and effective and thorough mixing within the target medium.

The proper amounts utilized in the various compositions and applications are highly dependent on each of those separate possibilities. Thus, in plastics, for example, the inventive UV absorber is added in an amount of from about 0.001 to about 1.5% by weight of the total plastic composition, preferably from about 0.01 to about 1.0%, and most preferably from about 0.05 to about 0.5%. Such plastics may include other standard additives, including antioxidants, clarifying agents, nucleators, acid scavengers, perfumes, colorants (for transparent, but colored applications), antistatic agents, and the like.

BRIEF DESCRIPTION OF THE DRAWINGS

FIG. 1 is a graphical representation of the UV/Vis measurement at 325 nm of the degradation of Vitamin A stock solutions within sample bottles plotting Absorbance over time of UV exposure.

FIG. 2 is a graphical representation of the UV/Vis measurement at 325 nm of the degradation of Vitamin $B_6$ stock solutions within sample bottles plotting Absorbance over time of UV exposure.

FIG. 3 is a graphical representation of the HPLC measurements for peak area of the degradation of Folic Acid stock solutions within sample bottles plotting measured peak area over time of UV exposure.

FIG. 4 is a graphical representation of the UV/Vis measurement at 632 nm of the degradation of color-generating (including iron) FD&C Blue #1 stock solutions within sample bottles plotting Absorbance over time of UV exposure.

DESCRIPTION OF THE PREFERRED EMBODIMENTS

The general methods of making and utilizing the preferred inventive UV absorbers are as following:

Preparation of Compounds

EXAMPLE 1

Two thousand two hundred and eighty grams of vanillin, 20 g of lanthanum phosphate catalyst were charged to an autoclave. The autoclave was then sealed, purged several times with nitrogen gas (to a pressure of 60 PSIG) and then pressurized to 5 PSIG of nitrogen. After heating the autoclave to 121° C., ethylene oxide was added to the reaction mixture until a total of 3960 g were added over time. Once all of the ethylene oxide was added, the mixture was post-cooked for a total of thirty minutes. The mixture was then cooled to 93° C. and stripped at reduced pressure for fifteen minutes in order to remove un-reacted ethylene oxide. The product is a pale yellow liquid with a hydroxyl number of 134.

Nine hundred and thirty eight grams of 4-polyoxyalkylene-3-methoxy-benzaldehyde from the reaction described above, 30 g of Vitamin E, 8 g of glycine, 150 g of water and 305 g of ethyl cyanoacetate were charged to a 5 liter three neck round bottom flask. In the presence of a nitrogen atmosphere, the mixture was heated to 70° C. and held for three hours. Upon cooling to room temperature, 2500 ml of water was added and the mixture heated to 75° C. After phasing, the product layer was washed again with 2500 ml of water. Removal of water via a rotovap yielded 862 g of product that has a lambda max of 358 nm in methanol. Its color value in methanol, which is defined as absorption per gram of sample in 1000 ml of methanol, is 41 abs/g/l.

One thousand grams of such UV absorber was then mixed with 5 g of ClearTint® PC Violet 480 (a bluing agent) from Milliken & Company. The UV blend was then used for the application testing.

EXAMPLE 2

Four hundred and fifty-six grams of vanillin, one gram of KOH flake and four grams of proton sponge [1,8-bis(dimethylamino)naphthalene] were charged to an autoclave. The autoclave was then sealed, purged several times with nitrogen gas (to a pressure of 60 PSIG) and then pressurized to 5 PSIG of nitrogen. After heating the autoclave to 121° C., ethylene oxide was added to the reaction mixture until a total of 792 g were added over time. Once all of the ethylene oxide was added, the mixture was post-cooked for a total of thirty minutes. The mixture was then cooled to 93° C. and stripped at reduced pressure for fifteen minutes in order to remove un-reacted ethylene oxide. One thousand two hundred and fifty-three grams of product (yield 97%) is obtained as a pale yellow liquid with a hydroxyl number of 142.

100.4 grams of 4-polyoxyalkylene-3-methoxy-benzaldehyde from the reaction described above, 0.82 g of Vitamin E, 0.92 g of glycine, 20 g of water and 26.3 g of ethyl cyanoacetate were charged to a 250-ml three neck round bottom flask. In the presence of a nitrogen atmosphere, the mixture was heated to 70° C. and held for three hours. Upon cooling to room temperature, 150 ml of water was added and the mixture heated to 75° C. After phasing, the product layer was washed again with 150 ml of water. After the removal of water via a rotovap, the residue liquid was diluted with 200 ml of MeOH. The mixture was then filtered through a 5-micron filter to yield 80 g of light yellow liquid product that has a lambda max of 360 nm in methanol. Its color value in methanol, which is defined as absorption per gram of sample in 1000 ml of methanol, is 42 abs/g/l.

One thousand grams of such UV absorber was then mixed with 5 g of ClearTint® PC Violet 480 from Milliken & Company. The UV blend was then used for the application testing.

EXAMPLE 3

One thousand eight hundred and thirty grams of 4-hydroxybenzaldehyde, 20 g of lanthanum phosphate catalyst (as used above in EXAMPLE 1) were charged to an autoclave. The autoclave was then sealed, purged several times with nitrogen gas (to a pressure of 60 PSIG) and then pressurized to 5 PSIG of nitrogen. After heating the autoclave to 121° C., ethylene oxide was added to the reaction mixture until a total of 3960 g were added over time. Once all of the ethylene oxide was added, the mixture was post-cooked for a total of thirty minutes. The mixture was then cooled to 93° C. and vacuum stripped for fifteen minutes in order to remove unreacted ethylene oxide. The product is a pale yellow liquid with a hydroxyl number of 144.

Eight hundred sixty grams of 4-polyoxyalkylene-benzaldehyde from the reaction described above, 30 g of Vitamin E, 8 g of glycine, 150 g of water and 305 g of ethyl cyanoacetate were charged to a 5 liter three neck round bottom flask. In the presence of a nitrogen atmosphere, the mixture was heated to 70° C. and held for three hours. Upon cooling to room temperature, 2500 ml of water were added and the mixture heated to 75° C. After phasing, the product layer was washed again with 2500 ml of water. Removal of water via roto vap yielded 862 g of product that has a lambda max of 338 nm in methanol.

EXAMPLE 4

Eight hundred grams of resorcinol, 400 g of toluene and 4 g of sodium hydroxide pellets were charged to an autoclave. The autoclave was then sealed, purged several times with nitrogen gas (to a pressure of 60 PSIG) and then pressurized to 5 PSIG of nitrogen. After heating the autoclave to 121° C., ethylene oxide was added to the reaction mixture until a total of 1920 g were added over time. Once all of the ethylene oxide was added, the mixture was post-cooked for a total of thirty minutes. The mixture was then stripped at 100° C. via rotovap in order to remove unreacted ethylene oxide and toluene (water was added periodically to aid in the removal of toluene). The final product had a hydroxyl number of 304.

Two hundred sixty six grams of polyoxyalkylene resorcinol from the reaction described above, 193 g of acetic anhydride and 2 g of N-methylimidazole were charged to a three neck one liter round bottom flask. The mixture was heated under a nitrogen atmosphere to 130° C. and held for three hours. After cooling to room temperature, the mixture was transferred to a 2 liter one neck round bottom flask and 200 g of water were added. The mixture was stripped at 100° C. via roto vap in order to remove the acetic acid byproduct. After removal of the acetic acid, 310 g of polyoxyalkylene resorcinol di-acetate remained.

To a five liter three neck flask, 915 g of N,N-dimethyl formamide was charged. While under a nitrogen purge, 34 g of 50% hypophosphorous acid was charged to the five liter flask. The resulting mixture was cooled to −5° C., at which 664 g of phosphorous oxychloride were added slowly while maintaining a temperature between −5 and 0° C. The resulting Vilsmeier complex was added to a mixture (purged with nitrogen) of 1138 g polyoxyalkylene resorcinol diacetate, 28 g of 50% hypophosphorous acid and 30 g of acetic anhydride. The temperature did not exceed 25° C. during the addition of the Vilsmeier complex. Once the addition was complete, the mixture was heated under a nitrogen atmosphere to 70° C. and held for two hours. Subsequently, the mixture was cooled to room temperature and added to a solution containing 2492 g of water and 1566 g of 50% sodium hydroxide solution. This mixture was heated under a nitrogen atmosphere to 75° C. and phased. The product layer was combined with 876 g of water, 546 g of 50% sodium hydroxide solution and 92 g of 45% potassium hydroxide solution. While under a nitrogen atmosphere, the mixture was heated to 70° C. and held for three hours. After cooling to room temperature, 1000 g of water were added the mixture after it was neutralized with 93% sulfuric acid solution to a pH of 7. The resulting mixture was heated under a nitrogen atmosphere to 75° C. and phased. The product layer was stripped and passed through a filter leaving 880 g of a pale yellow liquid. A 5% methanol solution of this liquid had a Gardner color (1953 series) of 6. An IR spectra of this product shows a peak at 1670 cm$^-$ (aldehyde carbonyl stretch). In methanol, this substance has a lambda max of 273 nm in addition to a second peak at 312 nm.

To a 500 ml three neck round bottom flask, 91 g of 2,4-polyoxyalkylene benzaldehyde from the reaction described above, 3 g of Vitamin E, 0.85 g of glycine, 31 g of ethyl cyanoacetate and 20 g of water were charged. While under an atmosphere of nitrogen, the reaction mixture was heated to 70° C. and held for three hours. After cooling the mixture to room temperature, 250 g of water were added and the mixture heated under nitrogen to 75° C. The phased product layer was washed again with 250 g of water. Upon stripping, 95 g of product remained. In methanol, this substance has a lambda max of 367 nm.

One thousand grams of such UV absorber was mixed with 8 g of ClearTint® PC Violet 480 from Milliken chemical. The UV blend was then used for the application testing.

Comparative Example 1

Two thousand two hundred and eighty grams of vanillin, 20 g of sodium hydroxide catalyst were charged to an autoclave. The autoclave was then sealed, purged several times with nitrogen gas (to a pressure of 60 PSIG) and then pressurized to 5 PSIG of nitrogen. After heating the autoclave to 121° C., ethylene oxide was added to the reaction mixture until a total of 3960 g were added over time. Once all of the ethylene oxide was added, the mixture was post-cooked for a total of thirty minutes. The mixture was then cooled to 93° C. and vacuum stripped for fifteen minutes in order to remove unreacted ethylene oxide. The product is an amber liquid with a hydroxyl number of 134.

Nine hundred and thirty eight grams of 4-polyoxyalkylene-3-methoxy-benzaldehyde from the reaction described above, 30 g of Vitamin E, 8 g of glycine, 150 g of water and 305 g of ethyl cyanoacetate were charged to a 5 liter three neck round bottom flask. In the presence of a nitrogen atmosphere, the mixture was heated to 70° C. and held for three hours. Upon cooling to room temperature, 2500 ml of water were added and the mixture heated to 75° C. After phasing, the product layer was washed again with 2500 ml of water. Removal of water via roto vap yielded 862 g of product, which has a lambda max of 358 nm in methanol. Its color value in methanol, which is defined as absorption per gram of sample in 1000 ml of methanol, is 25 abs/g/l.

Comparative Example 2

To a 500 ml three neck flask, 135 g of N,N-dimethyl formamide was charged and purged with nitrogen. Once cooled to –5° C., 99 g of phosphorous oxychloride were added slowly while maintaining a temperature between –5 and 0° C. The resulting Vilsmeier complex was added to a mixture (purged with nitrogen) of 169 g polyoxyalkylene (6EO) resorcinol diacetate and 4.5 g of acetic anhydride. The temperature did not exceed 25° C. during the addition of the Vilsmeier complex. Once the addition was complete, the mixture was heated under a nitrogen atmosphere to 70° C. and held for two hours. Afterwards, the mixture was cooled to room temperature and added to a solution containing 369 g of water and 232 g of 50% sodium hydroxide solution. This mixture was heated under a nitrogen atmosphere to 75° C. and phased. The product layer was combined with 153 g of water, 95 g of 50% sodium hydroxide solution and 16 g of 45% potassium hydroxide solution. While under a nitrogen atmosphere, the mixture was heated to 70° C. and held for three hours. After cooling to room temperature, 112 g of water were added the mixture after it was neutralized with 93% sulfuric acid solution to a pH of 7. The resulting mixture was heated under a nitrogen atmosphere to 75° C. and phased. The product layer was stripped and passed through a filter leaving 110 g of a light orange liquid. A 5% aqueous solution of this liquid had a Gardner color (1953 series) of 7.

Comparative Example 3

To a 500 ml three neck flask, 135 g of N,N-dimethyl formamide was charged and purged with nitrogen. Once cooled to –5° C., 99 g of phosphorous oxychloride were added slowly while maintaining a temperature between –5 and 0° C. The resulting Vilsmeier complex was added to a mixture (purged with nitrogen) of 169 g polyoxyalkylene (6EO) resorcinol diacetate and 4.5 g of acetic anhydride. The temperature did not exceed 25° C. during the addition of the Vilsmeier complex. Once the addition was complete, the mixture was heated under a nitrogen atmosphere to 90° C. and held for two hours. Afterwards, the mixture was cooled to room temperature and added to a solution containing 369 g of water and 232 g of 50% sodium hydroxide solution. This mixture was heated under a nitrogen atmosphere to 75° C. and phased. The product layer was combined with 153 g of water, 95 g of 50% sodium hydroxide solution and 16 g of 45% potassium hydroxide solution. While under a nitrogen atmosphere, the mixture was heated to 95° C. and held for three hours. After cooling to room temperature, 112 g of water were added the mixture after it was neutralized with 93% sulfuric acid solution to a pH of 7. The resulting mixture was heated under a nitrogen atmosphere to 75° C. and phased. The product layer was stripped and passed through a filter leaving 107 g of a dark reddish brown liquid. A 5% methanol solution of this liquid exhibited a Gardner color (1953 series) of 13.

Comparative Example 4

To a 500 ml three neck flask, 136 g of N,N-dimethyl formamide was charged. While under a nitrogen purge, 5.2 g of 50% hypophosphorous acid was charged to the 500 ml flask. The resulting mixture was cooled to –5° C., at which 99 g of phosphorous oxychloride were added slowly while maintaining a temperature between –5 and 0° C. The resulting vilsmeier complex was added to a mixture (purged with nitrogen) of 170 g polyoxyalkylene (6EO) resorcinol diacetate, 4.2 g of 50% hypophosphorous acid and 4.5 g of acetic anhydride. The temperature did not exceed 25° C. during the addition of the Vilsmeier complex. Once the addition was complete, the mixture was heated under a nitrogen atmosphere to 90° C. and held for two hours. Subsequently, the mixture was cooled to room temperature and added to a solution containing 369 g of water and 233 g of 50% sodium hydroxide solution. This mixture was heated under a nitrogen atmosphere to 75° C. and phased. The product layer was combined with 153 g of water, 95 g of 50% sodium hydroxide solution and 16 g of 45% potassium hydroxide solution. While under a nitrogen atmosphere, the mixture was heated to 95° C. and held for three hours. After cooling to room temperature, 112 g of water were added the mixture after it was neutralized with 93% sulfuric acid solution to a pH of 7. The resulting mixture was heated under a nitrogen atmosphere to 75° C. and phased. The product layer was stripped and passed through a filter leaving 100 g of a dark reddish brown liquid. A 5% methanol solution of this liquid had a Gardner color (1953 series) of 11.

Comparative Example 5

One thousand grams of p-formyl-N,N-polyoxyethyleneaniline (7 moles EO) were mixed with 124 parts of diethyl malonate and 30 parts of ammonium carbonate. The mixture was then heated between 70 and 75° C. for 10 hours. The reaction was monitored by the UV-Vis spectra of the mixture. When the reaction was completed, as indicated by the presence of an absorption maximum at 377 nm (A/gl=20.1), the product was then further stripped under reduced pressure to yield the final product.

Comparative Example 6

Seventeen g of 3,4-dimethoxybenzaldehyde, 70 ml of toluene, 1 g of piperidine and 15 g of ethylcyanoacetate were charged to a 250 ml three neck flask. In the presence of a nitrogen atmosphere, the mixture was heated to 110° C. and held for two hours. A precipitate formed on cooling. The precipitate was collected and recrystallized from 1:1 toluene:acetone. After drying in an oven set at 70° C., a light greenish-yellow solid remained which has a lambda max of 357 nm in methanol.

Comparative Example 7

Seventeen g of 2,4-dimethoxybenzaldehyde, 70 ml of toluene, 1 g of piperidine and 15 g of ethylcyanoacetate were charged to a 250 ml three neck flask. In the presence of a nitrogen atmosphere, the mixture was heated to 110° C. and held for two hours. A precipitate formed on cooling. The precipitate was collected and recrystallized from 1:1 toluene:acetone. After drying in an oven set at 70° C., yellow needles remained. A methanol solution containing this substance has a lambda max of 368 nm.

Comparative Examples 8 and 9

Synthesis of Vanillin UVA Model Compound-Ethyl 2-Cyano-3(4-Hydroxy-3-methoxyphenyl)propenoate

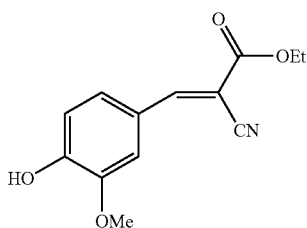

Method A: Vanillin (15.2 g, 0.1 mol), ethyl cyanoacetate (12.5 g, 1.1 eq) and ethanol (100 ml) were mixed in a 250-ml 3 neck round bottom flask equipped with a reflux condenser. While stirring, piperidine (1.5 g) was added and the whole mixture was refluxed for 2 hours. After cooling down to RT, the mixture was acidified to pH 5–6 by 10% HCl. The precipitate formed was collected by filtration, washed several times with methanol and dried in air to result a bright yellow crystalline product (9 g) which had a absorption of 360 nm in acetone.

Method B: Vanillin (15.2 g, 0.1 mol), ethyl cyanoacetate (12.5 g, 1.1 eq) and toluene (100 ml) were mixed in a 250-ml 3 neck round bottom flask equipped with a reflux condenser. While stirring, piperidine (1.5 g) was added and the whole mixture was refluxed for 2 hours. After cooling down to RT, the mixture was acidified by a few drops of 10% HCl. The precipitate formed was collected by filtration, washed several times with methanol and dried in air to result a yellow crystalline product (19.2 g) which had a absorption of 360 nm in acetone.

Commercial samples of Tinuvin® 234 was obtained from Ciba. Sample of Eastman Heatwave® UV concentrate was obtained and tested for comparative purposes as well. Such commercial samples were then introduced within certain thermoplastic end-uses as for the other Comparative Examples noted above. The Eastman UV absorber was introduced by actually polymerizing the UV absorber with the thermoplastic itself. The Ciba UV absorber was added as a powder within a molten thermoplastic formulation and then mixed thoroughly therein.

Thermoplastic Composition Formation

The UV absorber was introduced within an injection molding operation for a polyester thermoplastic, for instance polyethylene terephthalate. The liquid absorber was blended via agitation onto hot, dried polyethylene terephthalate resin (in pellet form) in a chamber, which minimized the adsorption of moisture, by the resin. The blend of absorber and pellets was gravity fed into the feed throat of the machine. In the feed section, melting was accomplished though the utilization of a heated (heat transferred from the barrel of the machine) screw extruder which rotated. The rotation of the screw provided thorough mixing of the absorber and molten resin together producing a uniform plastic melt which was injected into a mold in order to form the intermediate thermoplastic article, for instance a parison.

The intermediate article (such as the parison) was allowed to equilibrate at normal room temperature and humidity before being processed further. The article was positioned in front of a bank of infrared heaters that increased the temperature of the parison to its softening point. The heated parison was then transferred to a mold where a rod was inserted into the parison stretching the end of the parison to the bottom of the mold. Subsequently, pressurized air was blown into the stretched parison pushing the walls of the parison against the mold to form the desired thermoplastic article, such as a bottle.

Transmission Data for Polyester Resins

The percent transmission of UV light through 5 different PET bottle wall sections was measured on a Perkin-Elmer Lambda 35 UV-Vis Spectrometer with a 50 mm Integrating Sphere. The wall thickness for all samples is around 0.43 mm (17 mils). The UV transmission data is summarized in Table 2.

TABLE 1

PET Bottles for UV Transmission Testing

| Bottle ID | UV absorber loading and composition |
|---|---|
| A (control) | None |
| B (Comparative) | 1000 ppm Tinuvin ® 234 |
| C (Comparative) | Eastman UV absorber |
| D | 1000 ppm example 4 |
| E | 1000 ppm of example 1 |
| F | 1000 ppm of example 4 and 1000 ppm of Tinuvin ® 234 |

The transmittance spectra of the PET bottle wall sections were measured from 250 nm to 450 nm in 5 nm increments. The results are as follows:

TABLE 2

| Wavelength | Bottles Tested | | | | |
|---|---|---|---|---|---|
| (nm) | A | B | C | D | E |
| 250 | 0.679 | 0.216 | 0.204 | 0.051 | 0.139 |
| 255 | 0.71 | 0.166 | 0.142 | 0.013 | 0.128 |
| 260 | 0.721 | 0.136 | 0.078 | −0.025 | 0.078 |
| 265 | 0.734 | 0.136 | 0.174 | −0.017 | 0.050 |
| 270 | 0.816 | 0.132 | 0.162 | −0.133 | 0.058 |
| 275 | 0.835 | 0.122 | −0.002 | −0.116 | −0.077 |
| 280 | 0.843 | −0.045 | −0.155 | −0.035 | 0.028 |
| 285 | 0.734 | 0.122 | −0.123 | −0.104 | −0.074 |
| 290 | 0.702 | 0.089 | 0.053 | −0.092 | −0.080 |
| 295 | 0.555 | 0.039 | 0.011 | −0.175 | −0.054 |
| 300 | 0.549 | −0.017 | 0.006 | −0.122 | −0.089 |
| 305 | 0.446 | −0.004 | −0.025 | −0.070 | −0.119 |
| 310 | 0.656 | 0.068 | −0.079 | −0.150 | −0.114 |
| 315 | 0.851 | 0.013 | 0.050 | −0.058 | 0.026 |
| 320 | 6.071 | 0.436 | 0.206 | 0.718 | 0.780 |
| 325 | 37.58 | 2.617 | 0.220 | 5.514 | 3.692 |
| 330 | 57.683 | 3.501 | −0.330 | 7.907 | 4.931 |
| 335 | 64.309 | 3.159 | −0.070 | 7.553 | 4.983 |
| 340 | 67.429 | 2.602 | −0.069 | 5.948 | 4.161 |
| 345 | 70.121 | 2.265 | 0.074 | 4.180 | 3.130 |
| 350 | 72.762 | 2.236 | 0.070 | 2.785 | 2.300 |
| 355 | 74.583 | 2.500 | 0.041 | 1.868 | 1.728 |
| 360 | 76.104 | 3.261 | 0.095 | 1.328 | 1.368 |
| 365 | 78.368 | 4.853 | 0.093 | 1.040 | 1.267 |
| 370 | 80.465 | 7.642 | 0.426 | 0.930 | 1.207 |
| 375 | 81.829 | 12.652 | 2.074 | 0.916 | 1.317 |
| 380 | 82.801 | 21.659 | 8.993 | 1.215 | 1.659 |
| 385 | 83.594 | 35.960 | 26.268 | 1.902 | 2.530 |
| 390 | 83.953 | 53.233 | 48.346 | 3.286 | 4.718 |
| 395 | 84.433 | 67.935 | 64.050 | 6.169 | 9.771 |
| 400 | 84.896 | 77.356 | 72.800 | 12.863 | 20.208 |
| 405 | 85.308 | 82.362 | 77.255 | 25.844 | 36.351 |
| 410 | 85.654 | 84.707 | 79.610 | 43.944 | 53.844 |
| 415 | 85.932 | 85.863 | 81.020 | 61.386 | 67.699 |
| 420 | 86.149 | 86.466 | 82.089 | 73.656 | 76.392 |

TABLE 2-continued

| Wavelength (nm) | Bottles Tested | | | | |
|---|---|---|---|---|---|
| | A | B | C | D | E |
| 425 | 86.501 | 86.954 | 82.985 | 80.690 | 81.153 |
| 430 | 86.664 | 87.217 | 83.691 | 84.044 | 83.497 |
| 435 | 86.892 | 87.409 | 84.207 | 85.562 | 84.681 |
| 440 | 87.016 | 87.570 | 84.756 | 86.323 | 85.345 |
| 445 | 87.196 | 87.768 | 85.045 | 86.683 | 85.748 |
| 450 | 87.310 | 87.868 | 85.351 | 86.891 | 85.981 |

Since the lower % transmission represents better performance, it is evident that from a larger range of wavelengths, the inventive UV absorbers provide greater overall protection for the target PET resin. The inventive UV absorbers provide much improved UV protection at longer wavelength range (between 370–390 nm). Furthermore, only the PET bottles with the inventive UV absorbers can meet the specification of transmission under 10% for wavelength below 390 nm.

Protecting the Content from UV Damage

The main objective to incorporate UV absorber into PET packaging is to protect the content from harmful UV damage. Such needs are more acute in food packaging. It is generally known that UV light would cause degradation of various nutrients, such as vitamins, minerals, flavorings, and colorants. It is now found that the inventive UV absorbers offer much improved protection against UV damage relative to the commercial UV absorbers, primarily due to the increase in protected UV wavelength range up to at least 390 nm. Such an extended range (over the base level of 370 nm typically provided by standard UV absorbers that exhibit both low migration as well as low color levels within thermoplastics such as PET) provides, as presented below, a greatly improved ability to protect standard vitamins, etc., from UV degradation, thereby increasing the long-term shelf stability of such materials stored within clear, colorless, thermoplastic packaging.

Vitamins provide a wide and varied range of functions in the human body; however, a number of the most important types are highly susceptible to degradation or loss of function due to excessive UV exposure (particularly up to the 390 nm wavelength). Vitamins A, $B_2$ (riboflavin), $B_6$, as well as folic acid, are particularly problematic from an ultraviolet exposure perspective, yet are very important to the human diet. For example, Most B vitamins are involved in the process of converting blood sugar into energy. Diets rich in B vitamins are particularly important for pregnant and breast-feeding women and for other people who require more energy, such as athletes and heavy-labor workers. Vitamin $B_2$, Riboflavin, is very important in the production of energy. Vitamin $B_2$ can be found in milk, dried fortified cereals, and low fat yogurt. Deficiencies affect the skin and mucous membranes. Though riboflavin is quite stable to heat, it is very sensitive to light. It is particularly sensitive to ultraviolet light. Likewise, the other vitamins and folic acid are particularly sensitive to the same problems and provide similarly important benefits to the human body. Studies were thus conducted to determine the effectiveness of the inventive PET containers (bottles, in this instance, as a non-limiting example) to prevent the degradation of vitamins A, $B_2$, $B_6$, and folic acid due to light exposure. Certain vitamins are also commonly found in the presence of trace quantities of transition metals (such as iron) within beverages (such as, for example, orange juice, and the like). Thus, for testing purposes, below certain stock solutions of test samples include trace metals.

Stock solutions of these materials were prepared wherein each of the vitamins and colorant solution exhibited an initial absorbance of from about 0.17 to about 0.25 at their lamba max levels (from about 320–330 nm for the Vitamins A and $B_6$, 444 nm for Vitamin $B_2$, and about 630–635 nm for FD&C Blue #1), for measuring color loss (absorbance reduction) on a Perkin Elmer Lambda 35 UV/Vis Spectrometer (folic acid loss was measured via HPLC). The stock solutions were made in accordance with the following:

a) A riboflavin solution was prepared by dissolving 50 mg/L of the vitamin in deionized water. The stock solution exhibited an initial absorbance of about 0.2 at 325 nm.

b) A Vitamin A solution was prepared by dissolving 2 mg/L of the vitamin in ethanol. The stock solution of Vitamin A showed an initial absorbance of 0.245 at a wavelength of 326 nm.

c) A Vitamin $B_6$ solution was prepared by dissolving 5 mg/L of the vitamin in deionized water. The stock solution exhibited an initial absorbance of 0.1916 at a wavelength of 325 nm.

d) A Folic Acid solution was prepared by dissolving 1 mg/L of the acid within a 3.5 pH aqueous citric acid solution with a further 1 mg/L of iron chloride added. Vitamin loss was monitored using a Waters 996 HPLC for this stock solution, therefore an initial absorbance was not recorded. The chromatogram of the folic acid solution was obtained on Beckman Coulter Ultrasphere 15 cm×2 mm column packed with 5 micrometer C18, using a flow rate of 0.5 mL/min and a mobile phase composed of 0.0125% solution of trifloroacetic acid.

e) An FD&C Blue #1 stock solution was prepared by dissolving 1.1 mg/L of the dye within a 3.5 pH aqueous citric acid solution with a further 1 mg/L of $FeCl_3$. The stock solution of blue showed an initial absorbance of 0.1716 at a wavelength of 632 nm.

Each stock solution was then protected from light until placed into the sample bottles and tested for degradation. The testing was carried out in a VWR light refrigerator, model 2015 manufactured in the US by Sheldon Manufacturing Inc. The light source consisted of eight Sylvania 351 Ultra Violet bulbs. The temperature of the refrigerator was held constant at 4° Celsius and measurements were taken at specific time intervals (the test is hereinafter called "the UV Refrigeration Test"). Sample bottles (including the individual stock solutions above) were placed on racks 5 inches from the light source in a central position. All samples were oriented in an identical manner relative to the light source to provide equivalent light exposure to all samples. Other than for the riboflavin testing (the results for which are provided in Table 3, below), the time intervals were 30 minutes, 1 hour, 2 hours, 3, hours, 5 hours, 7 hours, 9 hours, and 14 hours, and the tested bottles were those including just PET (no UV absorber)(Bottle A-exposed), a foiled sample (completely opaque and protected from light)(Bottle A-foiled control), Comparative Bottle Sample B, and Inventive Bottle Sample E.

For the riboflavin stock solutions, the tested PET bottles were filled with the stock solution and were placed in a Q-Panel QUV Accelerated Weathering Tester with eight Sylvania UVA-351 bulbs (hereinafter, "the UV Weathering Test"). The choice of UVA light bulbs is to simulate the exposure to fluorescent light during warehouse, supermarket or other indoor storage. The degradation of the riboflavin was followed by monitoring the absorption of the visible absorption peak at 444 nm. The control sample was covered with aluminum foil and was subjected to the same treatment. The test data is summarized in table 3.

TABLE 3

% Residual Riboflavin after Light Exposure

| Bottle ID | Light Exposure Duration (hours) | | | | | |
|---|---|---|---|---|---|---|
| | 0 | 1 | 3 | 5 | 7 | 9 |
| A (foiled control) | 100% | 100% | 100% | 100% | 100% | 100% |
| A (exposed) | 100% | 73% | 25% | 6% | 3% | <1% |
| B | 100% | 92% | 77% | 59% | 44% | 31% |
| D | 100% | 95% | 86% | 72% | 62% | 50% |
| E | 100% | 96% | 85% | 70% | 60% | 48% |
| F | 100% | 100% | 89% | 81% | 73% | 62% |

The data shows that the foiled control sample maintains the same concentration of riboflavin. Thus, the degradation is entirely caused by light exposure. All PET bottles containing UV absorbers show much higher level of retained riboflavin than control. The bottles with the inventive UV absorbers show significant higher level of retained riboflavin than the bottle with the best commercial product. Among all bottles, Bottle F shows the best protection of the content against light exposure; however, it also exhibits some migration problems. Thus, any retention in excess of about 35% is well above that provided by any prior art UV absorbers, and thus prior art clear, colorless, thermoplastic containers.

As for the remaining samples, their degradation histories are provided within the drawings. As noted in FIG. 1, the Vitamin A solution exhibited a reduction in absorbance from its initial level of 0.245 to about 0.225 for the inventive sample bottle (a % reduction of 8.1%, retention of 91.9%). The comparative prior art sample bottle exhibited nearly a complete loss of color (to about 0.015, or a reduction of 94%, or a retention of 6%.) after about 10–14 hours exposure. Thus, the 390 nm protection provides much better protection than at the limited range up to 370 nm. Any measured % retention in excess of 10% is thus above that provided by any prior art samples (and thus should be considered a property imparted by the inventive bottles).

As noted in FIG. 2, the Vitamin $B_6$ exhibited a reduction in absorbance from its initial level of 0.1916 with no measurable reduction (essentially 100% retention) for the inventive sample bottle. The comparative prior art sample bottle exhibited a reduction in absorbance to about 0.095 (reduction of about 50%; retention of about 50%) after 14 hours exposure. Thus, the 390 nm protection provides much better protection than at the limited range up to 370 nm. Any retention above about 60% is thus above that provided by any prior art samples (and thus should be considered a property imparted by the inventive bottles).

As noted in FIG. 3, there is a clear differential between the foiled control and the inventive folic acid-containing sample of from 100000 to 60000 (in peak area measured within the chromatogram), thus a differential of about 40% (thus a retention of 60%). To the contrary, the prior art sample bottle exhibited a degradation effect for folic acid as a differential between the foil control and the comparative sample bottle of 100000 and less than 20000, or in excess of 80% (retention of just 20%). A degradation differential between a sample foil bottle and an inventive sample bottle thus can be measured as the % retention of from 30 to 99%, preferably between 40 and 95%, and most likely between 50 and 90%. Again, the differential for 370 nm protection is much greater than these ranges. Thus, 390 nm protection provides much greater protection for the target folic acid component (and thus should be considered a property imparted by the inventive bottles).

As depicted in FIG. 4, the FD&C Blue #1 colorant exhibited a reduction in absorbance from its initial level of 0.1716 to about 0.06 for the inventive sample bottle (a % reduction of 65%, a retention of 35%). The comparative prior art sample bottle exhibited a complete loss of color (100%; o % retention) after 14 hours exposure. Thus, the 390 nm protection provides much better protection than at the limited range up to 370 nm. Any measured % reduction in excess of 5% is thus above that provided by any prior art samples (and thus should be considered a property imparted by the inventive bottles).

Colorimetric Data for Polyester Resins

Although other UV absorbers with longer wavelength absorption have been disclosed, they usually impart color within the polyester article. For many of the packaging application, a colorless and transparent package is essential. The inventive UV absorbers possess the exquisite balance of imparting exceptional UV screening ability and no color to the PET articles.

The Colorimetric data of the different PET bottle wall sections was measured on a Gretag-Macbeth ColorEye 7000A Spectrophotometer. The Colorimetric data, specifically L*, indicating the lightness/darkness, and b*, indicating yellowness/blueness of the PET bottle wall section are as follows:

TABLE 4

Colorimetric data of PET Resins

| UV absorber (from Table 1, above, with ppm) | L* | b* |
|---|---|---|
| Example 4 (1000 ppm) | 93.89 | 2.10 |
| Example 1 (1000 ppm) | 93.79 | 2.22 |
| Comparative Example 1 (1258 ppm) | 95.51 | 6.25 |
| Comparative Example 3 (873 ppm) | 95.33 | 5.61 |

Thus, the comparative examples exhibit similar L* values (brightness) but with simultanouesly high yellowness (b* values). Measurements for these values are preferably at least 90 for L* and at most about 2.5 for b* to signify a low yellowing resin with very low amounts of graying bluing agents, and thus a very bright appearance.

Colorimetric Data for Liquid UV Absorbers

As stated before, being colorless is very important for this application. The inventive process can reduce the level of color within the inventive UV absorbers. In this experiment, the UV absorbers were dissolved in methanol to make up a 5% solution. The Gardner color was measured. Data is shown in the table 5. A higher Gardner color indicates that the UV absorber is more likely to impart color within the final PET article.

TABLE 5

Gardner Color of UV Absorbers

| Sample (from Examples above) | Gardner Color |
|---|---|
| 1 | 10 |
| 4 | 11 |
| Comparative Example 1 | 11 |
| Comparative Example 3 | 18 |

Thus, the data show that the inventive process significantly reduce the level of color within the inventive liquid UV absorbers.

Extraction

Food packaging is one of the largest application that requires UV protection within the packaging material. Therefore, exhibition of non-migration characteristics under normal use conditions is an important requirement for the inventive colorless UV absorbers. Their migratory properties were studied by the following extraction test.

Polyester plaques containing the UV absorber additives were prepared using standard compounding methods. Each plaque had a surface area of 12.5 in². The PET plaques were made using ClearTuf® 8006 PET (from M&G Polymers) resin while the PEN plaques were prepared using PEN Hypertuf® (from M&G Polymers).

For each additive, the following extraction procedure was followed:

Solutions of 95% ethanol were used as food simulating solvent. USP 200 proof absolute ethanol was diluted with DI water to prepare the extraction solvents. Stainless steel pressure vessels having Teflon®-lined tops were used as extraction vessels in this study. 125 g of extracting solvent and 6 plaques/vessel were employed in these studies. The plaques were arranged so that the plaques were immersed and exposed on all sides to the extraction solvent.

Six plaques were cut in half and placed in a stainless steel extraction vessel and 125 g of 95% ethanol (preheated to 70° C.) was added. The vessels were then sealed and placed in a 70° C. oven for 2 hours, at which time they were then removed. Subsequently, the plaques were then removed from the extraction vessels and the solvent was allowed to cool to ambient temperature. The extract solutions were then analyzed spectrophotometrically to determine if any UV absorbers had been extracted from the target resins.

The extracts were analyzed spectrophotometrically to determine the presence or absence of extracted colorant. A Beckman® DU 650 spectrophotometer with a 10.00 cm path length cell was used. The instrument was first zeroed using the extract obtained from the uncolored polyester plaques. The extract from the extraction of the plaques containing the various additives was then scanned through the ultraviolet/visible range to determine the presence or absence of detectable peaks at the additives' λ max and the corresponding absorbency. Higher absorption level at the additives' λmax would indicate higher extraction level. The term "heated alcohol extraction test" as it pertains to this invention encompasses such an analytical procedure as this in association with this invention.

The results are summarized in the following table 6 and 7.

TABLE 6

Extraction Results in PET

| Sample UV absorber (from Examples above) | Loading | Extraction Result (absorption at λ$_{max}$) |
|---|---|---|
| Comparative example 6 | 284 ppm | 0.62 |
| Comparative example 7 | 272 ppm | 0.60 |
| Tinuvin ® 234 | 600 ppm | 0.20 |
| Comparative Example 8 | 200 ppm | 0.172 |
| Comparative Example 9 | 200 ppm | 0.179 |
| Example 1 | 600 ppm | 0.02 |
| Example 2 | 600 ppm | Non-detectable |

TABLE 7

Extraction Results in PEN

| Sample ID | Loading | Extraction Result (absorption at λ$_{max}$) |
|---|---|---|
| Comparative example 6 | 284 ppm | 0.016 |
| Comparative example 7 | 272 ppm | 0.030 |
| Tinuvin ® 234 | 600 ppm | 0.003 |
| Example 1 | 600 ppm | Non-detectable |
| Example 2 | 600 ppm | Non-detectable |

Thus, the data shows that inventive UV absorbers show much reduced extraction level that that of the comparative examples and the commercial UV absorbers. The inventive UV absorbers are more suitable for food contact applications. In the case of Comparative Examples 8 and 9, such results as noted above in Table 6 indicate that introduction of such UV absorbers (from the Pruett et al. patent) during the injection molding stage, rather than during the actual polymerization stage of the target thermoplastic results in highly undesirable extraction measurements, particularly in comparison with the polymeric UV absorbers of the instant invention.

While specific features of the invention have been described, it will be understood, of course, that the invention is not limited to any particular configuration or practice since modification may well be made and other embodiments of the principals of the invention will no doubt occur to those skilled in the art to which the invention pertains. Therefore, it is contemplated by the appended claims to cover any such modifications that incorporate the features of the invention within the true meaning, spirit, and scope of such claims.

What is claimed is:

1. A high clarity, substantially colorless thermoplastic polyester article having a relatively high light transmission in the visible light range of 450 nm, and a relatively low light transmission in the Ultraviolet (UV) light range of 390 nm, said thermoplastic article comprising:
   (a) at least one ultraviolet absorber compound, said ultraviolet absorber compound being dispersed in said polyester article in a concentration loading level, said ultraviolet absorber compound exhibiting ultraviolet absorption characteristics over the range of wavelengths from 300 to 400 nm;
   (b) said thermoplastic article exhibiting an extraction level for said ultraviolet absorber compound of at most 0.1 absorbance units from said thermoplastic article, said extraction level being measured as the level of absorbance exhibited by a heated alcohol extract solution after 2 hours exposure, said absorbance being measured within a cell of ten (10) cm in optical length;
   (c) wherein said high clarity thermoplastic polyester article exhibits at least 20–86 % T visible light transmission value at 450 nm for an article having a thickness of 17 mils, said article exhibiting a UV light transmission when exposed to UV radiation of at most 10% T at the 390 nm wavelength for a loading level of 2000 ppm or less for an article of a thickness of 17 mils, said thermoplastic article being substantially colorless; and
   (d) wherein said article provides protection from ultraviolet exposure whereby upon introduction of a 50 mg/L aqueous solution of Vitamin B$_2$ exhibiting an initial UV-Vis absorbance at a wavelength of 444 nm, further wherein said aqueous solution of Vitamin $B_2$ exhibits 48–62% retention of said initial UV-vis absorbance at 444 nm wavelength after about 9 hours of sealed exposure under the UV Weathering Test.

2. The high clarity thermoplastic article of claim 1 wherein said ultraviolet absorber compound exhibits an extraction level of at most 0.05 absorbance units when subjected to a heated extraction test for 2 hours.

3. The high clarity thermoplastic article of claim 1 wherein said ultraviolet absorber compound exhibits an extraction level of at most 0.025 absorbance units when subjected to a heated extraction test for 2 hours.

4. The high clarity thermoplastic article of claim 3 wherein said ultraviolet absorber compound exhibits an extraction level of at most 0.02 absorbance units when subjected to a heated extraction test for 2 hours.

5. A high clarity, substantially colorless thermoplastic polyester container article having a relatively high light transmission in the visible light range of 450 nm, and a relatively low light transmission in the Ultraviolet (UV) light range of 390 nm, said thermoplastic container article having an exterior and an interior, said thermoplastic article comprising at least one ultraviolet absorber compound in the wall of said article, wherein said high clarity thermoplastic polyester article exhibits 20–86 % T visible light transmission value at 450 nm for an article having a thickness of 17 mils, and a UV light transmission when exposed to UV radiation of at most 10% T at the 390 nm wavelength for a loading level of 2000 ppm or less for an article of a thickness of 17 mils, said thermoplastic article being substantially colorless, said article exhibiting an extraction level of said compound from said thermoplastic article measured as a level of absorbance of at most 0.1 absorbance units exhibited by a heated alcohol extract solution after 2 hours exposure; and wherein said wall of said article provides protection from ultraviolet exposure to said interior of said container article such that upon introduction of a 2 mg/L ethanol solution of Vitamin A exhibiting an initial UV-Vis absorbance at a wavelength of 325 nm, said Vitamin A exhibits retention in excess of 10% of said initial UV-Vis absorbance at 325 nm wavelength after 10 hours of sealed exposure under the UV Refrigeration test.

6. The high clarity thermoplastic article of claim 5 wherein said ultraviolet absorber compound exhibits an extraction level of at most about 0.05 absorbance units when subjected to a heated extraction test for 2 hours.

7. The high clarity thermoplastic article of claim 6 wherein said ultraviolet absorber compound exhibits an extraction level of at most about 0.025 absorbance units when subjected to a heated extraction test for 2 hours.

8. The high clarity thermoplastic article of claim 7 wherein said ultraviolet absorber compound exhibits an extraction level of 0.0 absorbance units when subjected to a heated extraction test for 2 hours.

9. A high clarity, substantially colorless thermoplastic polyester article having a relatively high light transmission in the visible light range of 450 nm, and a relatively low light transmission in the Ultraviolet (UV) light range of 390 nm; wherein said high clarity thermoplastic polyester article exhibits 20 86% T visible light transmission value at 450 nm for an article having a thickness of 17 mils, and a UV light transmission when exposed to UV radiation of at most 10% T at the 390 nm wavelength for a loading level of 2000 ppm or less for an article of a thickness of 17 mils; said article comprising at least one ultraviolet absorber compound, said ultraviolet absorber compound being dispersed in said polyester article in a concentration loading level, said ultraviolet absorber compound exhibiting ultraviolet absorption characteristics over the range of wavelengths from 300 to 400; said absorber compound exhibiting an extraction level from said thermoplastic article measured as the level of absorbance exhibited by a heated alcohol extract solution after 2 hours exposure of at most 0.1 absorbance units, said absorbance being measured within a cell of ten (10) cm in optical length; wherein said thermoplastic article is substantially colorless, and wherein said article provides protection from ultraviolet exposure such that upon introduction of a 5 mg/L aqueous solution of Vitamin $B_6$ exhibiting an initial UV-Vis absorbance at a wavelength of 325 nm, wherein said Vitamin $B_6$ exhibits at least 60% retention of initial absorbance at 325 nm wavelength after 14 hours of sealed exposure under the UV Refrigeration Test.

10. The high clarity thermoplastic article of claim 9 wherein said ultraviolet absorber compound exhibits an extraction level of at most about 0.05 absorbance units when subjected to a heated extraction test for 2 hours.

11. The high clarity thermoplastic article of claim 10 wherein said ultraviolet absorber compound exhibits an extraction level of at most 0.025 absorbance units when subjected to a heated extraction test for 2 hours.

12. The high clarity thermoplastic article of claim 11 wherein said ultraviolet absorber compound exhibits an extraction level of 0.0 absorbance units when subjected to a heated extraction test for 2 hours.

13. A high clarity, substantially colorless thermoplastic polyester article having a relatively high light transmission in the visible light range of 450 nm, and a relatively low light transmission in the Ultraviolet (UV) light range of 390 nm; wherein said high clarity thermoplastic polyester article exhibits 20–86% T visible light transmission value at 450 nm for an article having a thickness of 17 mils, and a UV light transmission when exposed to UV radiation of at most 10% T at the 390 nm wavelength for a loading level of 2000 ppm or less for an article of a thickness of 17 mils; said article comprising at least one ultraviolet absorber compound, said ultraviolet absorber compound being dispersed in said polyester article in a concentration loading level, said ultraviolet absorber compound exhibiting ultraviolet absorption characteristics over the range of wavelengths from 300 to 400; said absorber compound exhibiting an extraction level from said thermoplastic article measured as the level of absorbance exhibited by a heated alcohol extract solution after 2 hours exposure of at most about 0.1 absorbance units, said absorbance being measured within a tell of ten (10) cm in optical length; wherein said thermoplastic article is substantially colorless; and wherein said article provides protection from ultraviolet exposure such that upon introduction of a 1.1 mg/L aqueous citric acid, pH 3.5. solution of FD&C Blue #1, with 1 mg/L of $FeCl_3$ added, exhibiting an initial UV-Vis absorbance at a wavelength of 632 nm in the blue spectrum, wherein said FD&C Blue #1 exhibits at least 5% retention of initial absorbance at 632 nm wavelength after 14 hours of sealed exposure under the UV Refrigeration Test.

14. The high clarity thermoplastic article of claim 13 wherein said ultraviolet absorber compound exhibits an extraction level of at most 0.05 absorbance units when subjected to a heated extraction test for 2 hours.

15. The high clarity thermoplastic article of claim 14 wherein said ultraviolet absorber compound exhibits an extraction level of at most 0.025 absorbance units when subjected to a heated extraction test for 2 hours.

16. The high clarity thermoplastic article of claim 15 wherein said ultraviolet absorber compound exhibits an extraction level of 0.0 absorbance units when subjected to a heated extraction test for 2 hours.

17. A high clarity, substantially colorless thermoplastic polyester article having a relatively high light transmission in the visible light range of 450 nm, and a relatively low light transmission in the Ultraviolet (UV) light range of 390 nm; wherein said high clarity thermoplastic polyester article exhibits 20–86% T visible light transmission value at 450 nm for an article having a thickness of 17 mils, and a UV light transmission when exposed to UV radiation of at most 10% T at the 390 nm wavelength for a loading level of 2000 ppm or less for an article of a thickness of 17 mils; said article comprising at least one ultraviolet absorber compound, said ultraviolet absorber compound being dispersed in said polyester article in a concentration loading level, said ultraviolet absorber compound exhibiting ultraviolet absorption characteristics over the range of wavelengths from 300 to 400; said absorber compound exhibiting an extraction level from said thermoplastic article measured as the level of absorbance exhibited by a heated alcohol extract solution after 2 hours exposure of at most about 0.1 absorbance units, said absorbance being measured within a cell of ten (10) cm in optical length; wherein said thermoplastic article is substantially colorless, and wherein said article provides protection from ultraviolet exposure such that upon introduction of a 1 mg/L aqueous citric acid solution (pH 3.5) of Folic Acid with 1 mg/L of $FeCl_3$ added, exhibiting an initial peak area measurement via HPLC analysis, wherein said Folic acid exhibits at least 25% retention of initial peak area measurement after 8 hours of sealed exposure under the UV Refrigeration Test.

18. The high clarity thermoplastic article of claim 17 wherein said ultraviolet absorber compound exhibits an extraction level of at most 0.05 absorbance units when subjected to a heated extraction test for 2 hours.

19. The thermoplastic article of claim 18 wherein said ultraviolet absorber compound exhibits an extraction level of at most 0.026 absorbance units when subjected to a heated extraction test for 2 hours.

20. The high clarity thermoplastic article of claim 19 wherein said ultraviolet absorber compound exhibits an extraction level essentially zero absorbance units when subjected to a heated extraction test for 2 hours.

21. The article of claim 1 wherein said retention is between about 40% and about 60%.

22. The article of claim 1 wherein said retention is between about 50% and about 60%.

23. The article of claim 5 wherein said retention is between about 20% and about 85%.

24. The article of claim 5 wherein said retention is between about 50% and about 85%.

25. The article of claim 9 wherein said retention is at least about 80%.

26. The article of claim 13 wherein said retention is at least about 15%.

27. The article of claim 13 wherein said retention is at least about 25%.

28. The article of claim 17 wherein said retention is at least about 40%.

29. The article of claim 17 wherein said retention is at least about 50%.

* * * * *

UNITED STATES PATENT AND TRADEMARK OFFICE
CERTIFICATE OF CORRECTION

PATENT NO. : 7,097,789 B2 Page 1 of 1
APPLICATION NO. : 10/278664
DATED : August 29, 2006
INVENTOR(S) : Daniel M. Connor It is certified that error appears in the above-identified patent and that said Letters Patent is hereby corrected as shown below:

Column 28, claim 13, line 48 "tell" should be --cell--

Column 30, claim 19, line 5 "0.026" should be --0.025--

Signed and Sealed this

Twenty-first Day of November, 2006

JON W. DUDAS
*Director of the United States Patent and Trademark Office*